(12) United States Patent
Hirayama et al.

(10) Patent No.: US 10,988,335 B2
(45) Date of Patent: Apr. 27, 2021

(54) TRANSPORTING APPARATUS, PROGRAM, AND CONTROL METHOD OF TRANSPORTING APPARATUS

(71) Applicant: SEIKO EPSON CORPORATION, Tokyo (JP)

(72) Inventors: Ryoichi Hirayama, Fukuoka (JP); Wataru Beppu, Fukuoka (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/156,043

(22) Filed: Oct. 10, 2018

(65) Prior Publication Data

US 2019/0112139 A1    Apr. 18, 2019

(30) Foreign Application Priority Data

Oct. 12, 2017   (JP) ................. 2017-198253

(51) Int. Cl.
| | |
|---|---|
| *B65H 9/00* | (2006.01) |
| *B65H 7/02* | (2006.01) |
| *B65H 7/20* | (2006.01) |
| *B65H 3/06* | (2006.01) |
| *H04N 1/00* | (2006.01) |

(52) U.S. Cl.
CPC ............. *B65H 7/02* (2013.01); *B65H 3/063* (2013.01); *B65H 3/0653* (2013.01); *B65H 7/20* (2013.01); *H04N 1/00002* (2013.01); *B65H 2402/46* (2013.01); *B65H 2511/10* (2013.01); *B65H 2511/216* (2013.01); *B65H 2511/242* (2013.01); *B65H 2511/414* (2013.01); *B65H 2801/39* (2013.01)

(58) Field of Classification Search
CPC .......... B65H 9/00; B65H 9/002; B65H 9/004; B65H 9/20; B65H 3/063
See application file for complete search history.

(56) References Cited

U.S. PATENT DOCUMENTS

| | | | |
|---|---|---|---|
| 7,467,793 B2 * | 12/2008 | Tanabe | B65H 5/062 |
| | | | 271/227 |
| 9,432,538 B2 * | 8/2016 | Kobayashi | H04N 1/0074 |
| 2015/0207941 A1 * | 7/2015 | Koda | H04N 1/0079 |
| | | | 358/3.26 |
| 2015/0319335 A1 * | 11/2015 | Baba | H04N 1/047 |
| | | | 358/447 |
| 2016/0261758 A1 * | 9/2016 | Kimura | H04N 1/0032 |

FOREIGN PATENT DOCUMENTS

JP   2012-099947 A   5/2012

* cited by examiner

*Primary Examiner* — Thomas A Morrison
(74) *Attorney, Agent, or Firm* — Global IP Counselors, LLP

(57) ABSTRACT

A transporting apparatus (for example, image reading apparatus) includes a transporting mechanism that transports a document along a transporting path and a processing unit that determines an inclination error of the document. The processing unit determines whether or not the inclination error has occurred in accordance with a document size and a tilt angle of the document.

15 Claims, 12 Drawing Sheets

TRANSPORTING APPARATUS, PROGRAM, AND CONTROL METHOD OF TRANSPORTING APPARATUS

BACKGROUND

1. Technical Field

The present invention relates to a transporting apparatus, a program, a control method of the transporting apparatus, and the like.

2. Related Art

In the related art, a transporting apparatus which transports a document along a transporting path using a transporting mechanism is known. As the transporting apparatus, an image reading apparatus (image scanner) which acquires image data by reading the document using an image sensor provided on the transporting path is considered. In addition, the transporting apparatus may be a facsimile machine, a printing apparatus, or the like.

In the transporting apparatus, a paper jam is generated when the document is stuck in a certain place of the transporting path while the document (object to be transported) is fed and then discharged. As a cause of generation of the paper jam, inclination (skewing) of the document is considered. As a detecting method of the paper jam, a method of determining that a paper jam is generated in a case in which the document is proceeded by a certain distance and paper is not discharged from an inside of the transporting path is considered. In this case, when the paper jam is detected, there is a high probability that the document is already damaged and wrinkled.

With respect to that, JP-A-2012-99947 discloses a method of determining presence and absence of inclination using a time difference between a detection timing of a leading edge portion of the document by a detecting sensor and a detection timing of the leading edge portion of the document by a reading sensor.

In the method disclosed in JP-A-2012-99947, regardless of a great size or a small size of the document, the inclination is detected by whether or not the time difference matches with a reference value. The inclination becomes a problem because a feeding port, an edge guide, or the like interferers in the document so as to generate the paper jam, and thus the document is damaged. Therefore, even when the document is inclined, the inclination may not become a problem in many cases if the document does not receive the interference of the feeding port or the like. That is, in JP-A-2012-99947, in a case in which a document having a relatively small document size is set to be an object, there is a possibility that a transporting operation (image reading operation) may be stopped even when the transporting operation is needed to be stopped.

SUMMARY

An advantage of some aspects of the invention is to be capable of providing a transporting apparatus which performs an appropriate inclination error determination in accordance with a document size, a program, a control method of the transporting apparatus, and the like.

According to an aspect of the invention, there is provided a transporting apparatus including a transporting mechanism that transports a document along a transporting path, and a processing unit that determines an inclination error of the document, in which the processing unit determines whether or not the inclination error has occurred in accordance with a document size of the document and a tilt angle of the document.

In this configuration, the tilt angle when the inclination error is determined to occur is different in accordance with the size of the document. In this way, since the inclination error determination can be performed in accordance with the document size, there is less concern that the paper jam, damage to the document, or the like may be generated, and it is possible to suppress that the inclination error is erroneously determined to occur and the transporting operation is stopped in a situation in which a necessity of stopping of the transporting operation is low.

In the transporting apparatus, a sensor that detects the tilt angle and the document size of the document transported by the transporting mechanism may be further included.

In this configuration, when the sensor which detects the document size and the tilt angle is used, it is possible to perform the inclination error determination in accordance with the document size.

In the transporting apparatus, the sensor may be an image sensor that reads an image of the document in a reading area on the transporting path and outputs image data, and the processing unit may perform determination of the inclination error based on data in an area to be determined including an over-scan area on a leading edge side in the image data.

In this configuration, when the area to be determined including the over-scan area is used, it is possible to appropriately perform the inclination error determination based on the image data.

In the transporting apparatus, the processing unit may obtain the document size and the tilt angle based on the data in the area to be determined, and may determine the inclination error by a process of comparing an angle threshold set in accordance with the document size with the tilt angle.

In this configuration, based on the image data, it is possible to appropriately perform the inclination error determination in accordance with the document size.

In the transporting apparatus, the processing unit may compare a predicted position corresponding to a position of a leading edge of the document in a case in which an inclination is not generated with an actual position of the leading edge of the document transported by the transporting mechanism, and may determine that the inclination error has occurred in a case in which the actual position is deviated from the predicted position by a predetermined threshold or more on a downstream side of the transporting path, and a first threshold which is the predetermined threshold at a first position on the transporting path in a width direction may be greater than a second threshold which is the predetermined threshold at a second position, which is a position closer to an end portion side than the first position on the transporting path in the width direction.

In this configuration, when the inclination error determination is performed based on the deviation amount of the actual position from the predicted position, it is possible to reduce a process load of the inclination error determination or the like. In addition, when a threshold used for a determination in accordance with a position of the transporting path in the width direction is changed, it is possible to perform the inclination error determination in accordance with the document size.

In the transporting apparatus, an image sensor that reads an image of the document in a reading area on the transporting path and outputs image data may be further included, and the processing unit may detect an actual position of the leading edge of the document based on the image data and may perform determination of the inclination error based on the detected actual position.

In this configuration, it is possible to use the image sensor for detecting the actual position of the leading end of the document.

In the transporting apparatus, an image sensor that reads an image of the document in a reading area on the transporting path and outputs image data may be further included, the processing unit may determine that the inclination error has occurred in a case in which the document is present in an inclined area in an over-scan area on a leading edge side of the image data, and the inclined area may be an area corresponding to the first threshold and the second threshold.

In this configuration, it is possible to determine the inclination error by a simple process of determining whether or not the document is present in the inclined area.

In the transporting apparatus, the inclined area may be a linearly symmetrical area with a width center of the transporting path as a symmetry axis.

In this configuration, it is possible to set an appropriate inclined area.

In the transporting apparatus, the first threshold may be a threshold set based on a position of the leading edge side of the document in a case in which a first document having a relatively small document size is inclined by a first tilt angle, and the second threshold may be a threshold set based on the position of the leading edge of the document in a case in which a second document having a document size greater than that of the first document is inclined by a second tilt angle smaller than the first tilt angle.

In this configuration, it is possible to appropriately set each threshold for performing the inclination error determination in accordance with the document size.

In the transporting apparatus, the processing unit may compare a width center of the document with a width center of the transporting path, and the inclination error may be determined to be generated at a small tilt angle in a case in which the deviation amount of the width center of the document from the width center of the transporting path is great as compared to a case in which the deviation amount is small.

In this configuration, it is possible to perform the inclination error determination using more appropriate conditions by considering a relationship between the document and the width center of the transporting path.

According to another aspect of the invention, there is provided a program causing a computer to execute a control of the transporting mechanism that transports the document along the transporting path, and a process of determining that the inclination error has occurred at a tilt angle smaller than that in a case in which the document size is smaller than the threshold, in a case in which the document size of the document is equal to or greater than the threshold.

According to still another aspect of the invention, there is provided a control method of the transporting apparatus including controlling of the transporting mechanism that transports the document along the transporting path, and processing of determining that the inclination error has occurred at a tilt angle smaller than that in a case in which the document size is smaller than the threshold, in a case in which the document size of the document is equal to or greater than the threshold.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments will be described. Also, the embodiments to be described later does not unreasonably limit contents of the invention disclosed in claims. In addition, the entire configurations to be described in the embodiments are not required configuration conditions of the invention.

1. System Configuration Example

Hereinafter, as an example of a transporting apparatus, an image reading apparatus 11 will be described. However, as a modification example to be described later, it is considerable that a method of the embodiment extends to a transporting apparatus other than the image reading apparatus 11.

Figure 1:
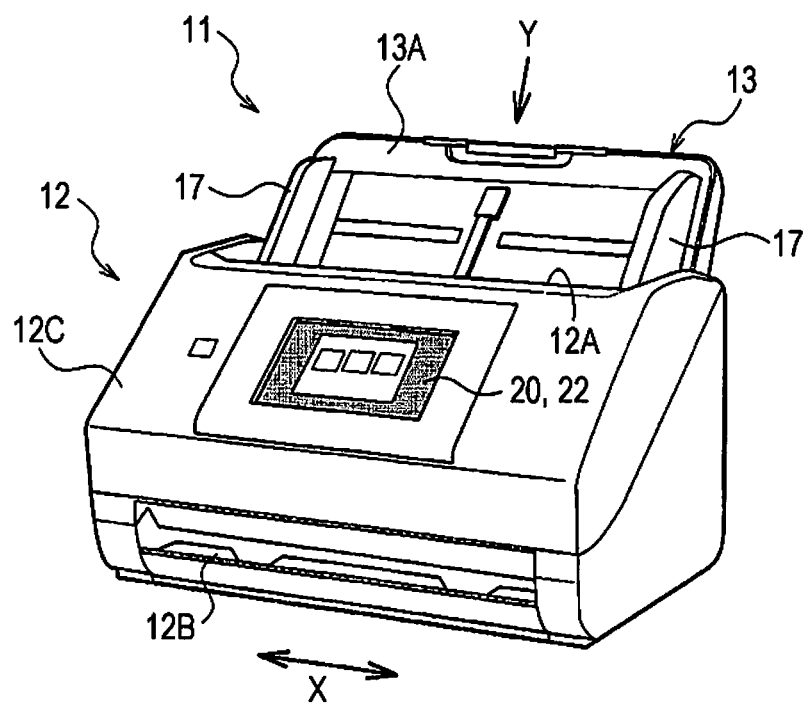
FIG. 1 is a perspective view illustrating an image reading apparatus.

FIG. 1 is a perspective view illustrating the image reading apparatus 11 according to an embodiment. As illustrated in FIG. 1, the image reading apparatus 11 of the embodiment includes an apparatus main body 12 (hereinafter, simply referred to as "main body 12") having a substantial trapezoidal shape when seen from a side, and a document support 13 having a placing surface 13A on which the document D, which is an object to be image-read, is placed (set). The document D placed on the document support 13 is fed one by one to a feeding port 12A opened on an upper portion of the main body 12. The fed document D is transported along a predetermined transporting path 32 (refer to FIG. 2) inside the main body 12, an image thereof is read at a reading position while the document is transported, and then the document is discharged from a discharging port 12B which is opened to a front side lower portion of the main body 12 so as to be loaded on, for example, a discharging tray 18A (refer to FIG. 2).

On the placing surface 13A of the document support 13, a pair of edge guides 17 is provided. The document D loaded on the placing surface 13A is pinched between the pair of edge guides 17, and is thus positioned so that the center of the document D is substantially positioned with respect to the feeding port 12A in a width direction X. Also, when the image reading apparatus 11 reads the image of the document, the width direction X indicates a main scanning direction, and a transporting direction Y indicates a sub scanning direction.

As illustrated in FIG. 1, a display unit 22 and an operating unit 20 are provided on a front surface unit 12C of the main body 12. The operating unit 20 is an operation interface which receives an input operation from a user. The display unit 22 is a display or the like which displays various information pieces to the user. The display unit 22 and the operating unit 20 are integrally configured as, for example, a touch panel. In addition, the operating unit 20 may include buttons and the like which are not illustrated.

Figure 2:
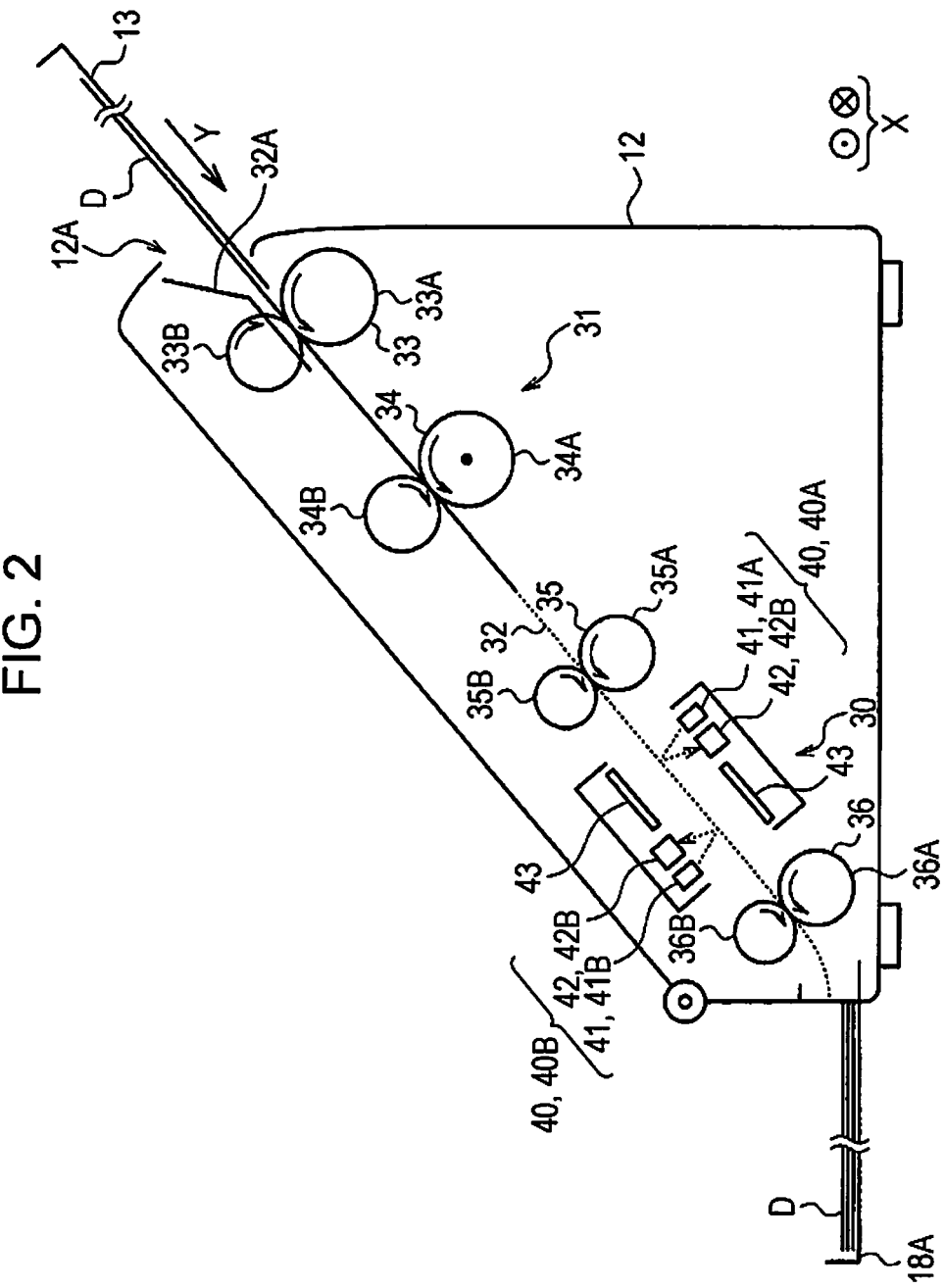
FIG. 2 is a sectional view illustrating the image reading apparatus.

As illustrated in FIG. 2, an image reading process mechanism 30 which performs an image reading process (scanning process) is provided inside the main body 12 of the image reading apparatus 11. The image reading process mechanism 30 includes a transporting mechanism 31 which transports the document D. The transporting mechanism 31 guides and feeds a plurality of the documents D loaded on the document support 13 one by one along a plate shaped feeding guide 32A from the feeding port 12A to the inside of the main body 12, and transports the fed document D at a constant transportation speed along the transporting path 32.

The transporting mechanism 31 includes a pair of feeding rollers 33 disposed at an upstream position of the transporting path 32 inside the main body 12, a pair of feeding rollers 34 disposed on a downstream side of the pair of feeding rollers 33 in the transporting direction, a pair of transporting rollers 35 disposed on an upstream side where a reading position of the document D is pinched in the transporting direction Y, and a pair of transporting rollers 36 disposed on a downstream side.

The pairs of feeding rollers 33 and 34 are constituted by driving rollers 33A and 34A and driven rollers 33B and 34B. In addition, the pairs of transporting rollers 35 and 36 are constituted by driving rollers 35A and 36A and driven rollers 35B and 36B. Each of the driven rollers 33B to 36B is rotated in accordance with rotation of the driving rollers 33A to 36A which respectively become a pair. Each of the driving rollers 33A to 36A constituting the plurality of the pairs of rollers 33 to 36 is rotary driven by power of a transporting motor 37 (refer to FIG. 4) which is a power source thereof.

As illustrated in FIG. 2, a pair of reading units 40 is provided on both sides where the transporting path 32 is pinched, at a reading position in the middle of the transporting path 32 formed by the pair of feeding rollers 33 and 34 and the pairs of transporting rollers 35 and 36 inside the main body 12. The pair of reading units 40 is constituted by a first reading unit 40A and a second reading unit 40B, and the reading units are disposed at a position slightly deviated from each other in the transporting direction Y at a degree at which the reading units do not face each other. The pair of reading units 40 is constituted by a light source 41 which is capable of irradiating the document D while being transported with light and an image sensor 42 which extends in a main scanning direction (width direction X). At the time of a reading mode of reading one surface (front surface) of the document D, the first reading unit 40A performs a reading operation, and at the time of the reading mode of reading both surfaces (front and rear surfaces) of the document D, both the first reading unit 40A and the second reading unit 40B perform the reading operation.

The light source 41 is constituted as, for example, an LED, a fluorescent lamp, or the like. The image sensor 42 receives reflection light of which light emitted from light source 41 is reflected to the document D or the like, and converts the received light into an electrical signal so as to output a pixel signal of a value in accordance with a received amount of the light. The image sensor 42 is, for example, a linear image sensor. The image reading apparatus 11 is capable of performing color scanning and monochrome scanning (gray scale scanning). In a color scanning method, there may be a method in which a light source of each color of RGB is sequentially emitted in a chronological order by the image sensor in a monochrome manner and a pixel signal of each color of RGB is sequentially acquired from the image sensor, and a method in which the image sensor includes a photoelectric conversion element of each color of RGB covered with a color filter and emits a white light source so as to acquire each pixel signal of RGB from the photoelectric conversion element. As a color scanning method, any methods may be used. Also, hereinafter, there may be a case in which, when the second light source 41B and the second image sensor 42B indicate a first reading unit 40A side and are referred to as the light source 41 and the image sensor 42, and when the second light source 41B and the second image sensor 42B indicate a second reading unit 40B side and are referred to as the first light source 41A and the first image sensor 42A as.

The image sensor 42 is, for example, a contact type image sensor in which a plurality of photoelectric conversion elements are arranged in a row along the main scanning direction X. Further, the image sensor 42 is specifically, a complementary metal oxide semiconductor (CMOS) image sensor.

Further, color reference plates 43 are disposed at positions facing each other where the image sensors 42 pinch the transporting path 32. The color reference plate 43 is used for obtaining a white reference value for shading correction, and a whitish white reference plate or a grayish (ash color) gray reference plate is used as the color reference plate. The gray reference plate is used for detecting a position and an area of the document D from read data obtained by reading the color reference plate 43 as a background of the document (gray background) based on a difference of colors or brightness values between the document and the background.

Figure 3:
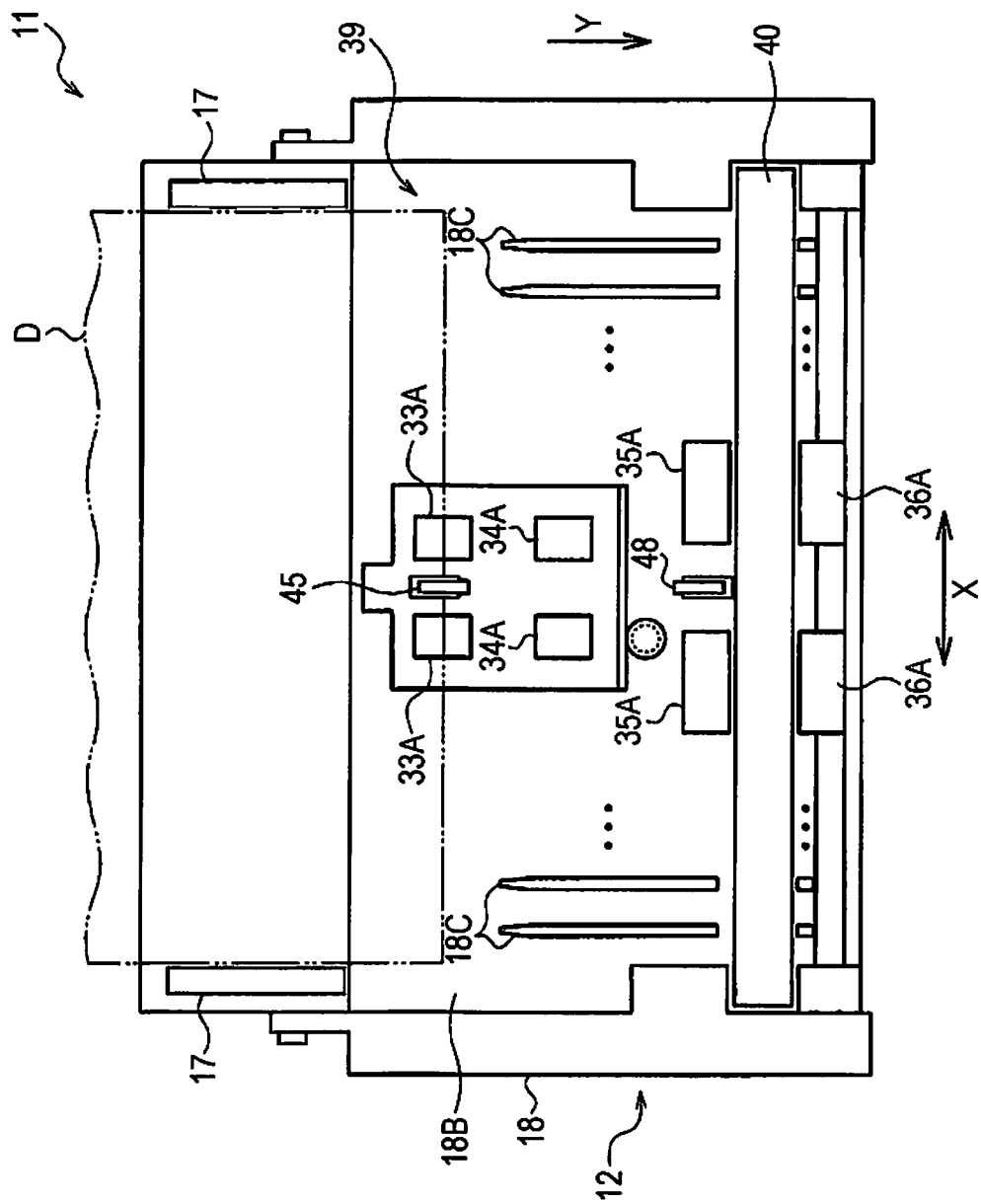
FIG. 3 is a plan view illustrating a transporting surface unit of the image reading apparatus.

Next, with reference to FIG. 3, a transporting surface unit 39 which forms a surface portion on a lower side in the transporting path 32 of the document D will be described. As illustrated in FIG. 3, a transporting surface unit 39 formed by an upper surface of the main body unit 18 includes a transporting plate 18B which covers the upper surface of the main body unit 18 and a plurality of ribs 18C which protrudes from the upper surface thereof and extends along the transporting direction Y so as to be parallel to each other. In a substantial center portion of transporting surface unit 39 in the width direction X, in order from an upstream side in the transporting direction Y, the driving rollers 33A and 34A, which constitutes the pair of feeding rollers 33 and 34, and the driving rollers 35A and 36A, which constitutes the pairs of transporting rollers 35 and 36, are respectively disposed in pairs with slight intervals in the width direction X.

A document sensor 45 is disposed between the pair of driving rollers 33A constituting the pair of feeding rollers 33. The document sensor 45 is, for example, a contact type sensor including a lever (contactor) and detects presence and absence of the document D set in the document support 13 by pressing the lever.

In addition, a document sensor 48 is disposed between the pair of driving rollers 35A constituting the pair of transporting rollers 35. The document sensor 48 is, for example, a contact type sensor including a lever (contactor). The document sensor 48 is switched from a non-detected state to a detected state when a leading edge of the document D presses the lever, but the document sensor is switched from the detected state to the non-detected state when a trailing edge of the document D passes through the lever so as not to press the lever. A detected result of the document sensor 48 is used for controlling determination of start and finish timings of reading operations being performed by the reading unit 40 (40A and 40B) disposed on a downstream side in the transporting direction Y. Also, at least one of the document sensor 45 and the document sensor 48 may be a non-contact type sensor such as an optical sensor.

Figure 4:
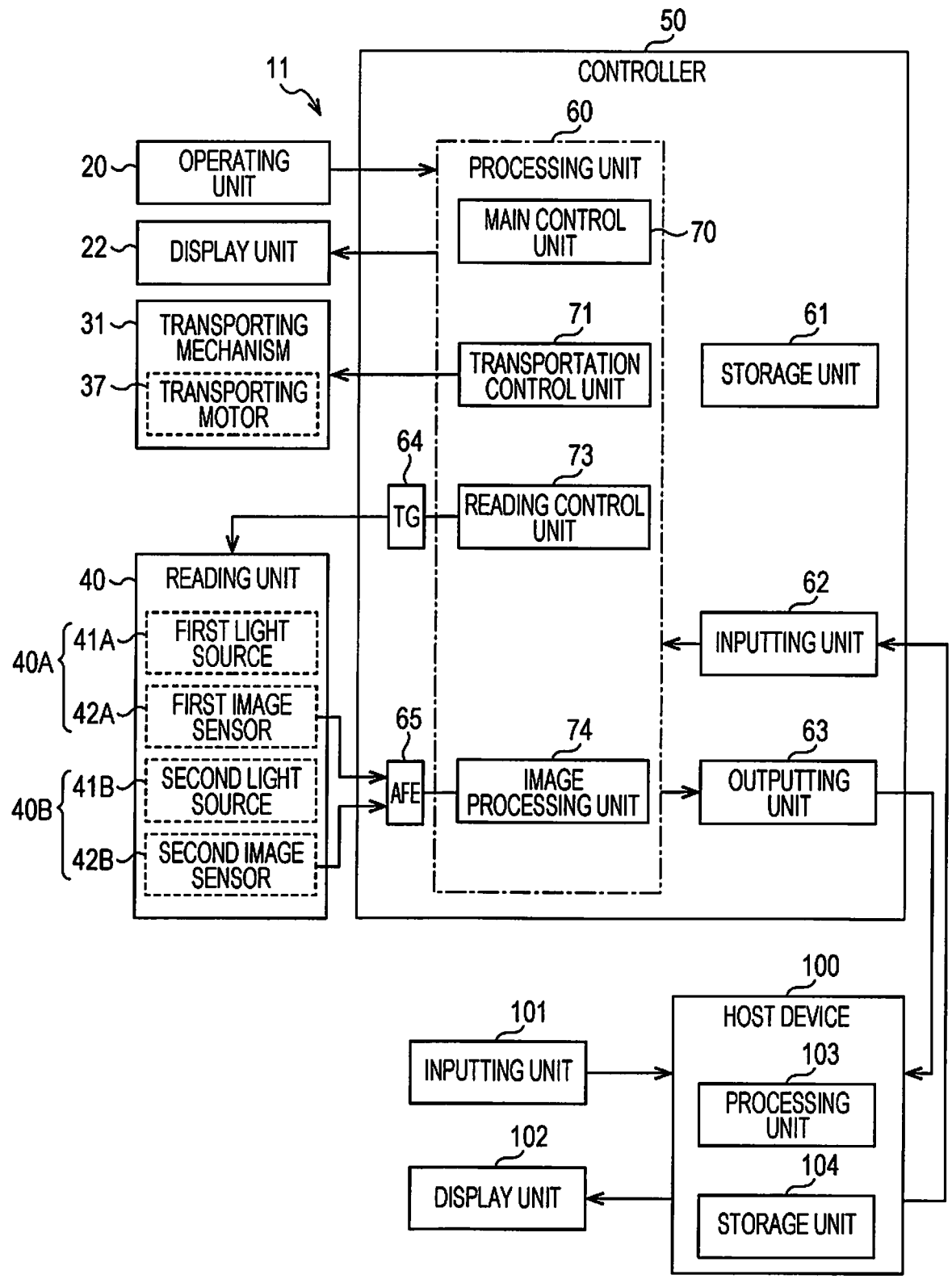
FIG. 4 is a diagram illustrating a configuration example of the image reading apparatus and a host device.

Next, with reference to FIG. 4, an electrical configuration of the image reading apparatus 11 will be described. As illustrated in FIG. 4, a controller 50 includes a processing unit 60, a storage unit 61, an inputting unit 62 which is constituted by an inputting interface inputting various data pieces or signals from a host device 100, and an outputting unit 63 which is constituted by an outputting interface outputting the data read by the image reading apparatus 11 to the host device 100. The processing unit 60 includes a main control unit 70, a transportation control unit 71 controlling the transporting motor 37, a reading control unit 73 controlling the reading unit 40, and an image processing unit 74 which performs various image processes and the like on the read data. Further, the controller 50 includes a timing generator 64 (hereinafter, also referred to as "TG 64") which outputs a pulse signal for regulating timings of various operations including a reading operation of a pixel signal with respect to the image sensors 42A and 42B. In addition, the controller 50 includes an analog front end 65 (hereinafter, also referred to as "AFE 65") which analog/digital converts (A/D converts) the pixel signal input from the image sensors 42A and 42B.

The transportation control unit 71 drives the transporting motor 37 in accordance with an instruction of the main control unit 70, and feeds an object to be read set in the document support 13 one by one to the inside of the main body 12 by rotating a plurality of the pairs of rollers 33 to 36. Further, the transportation control unit 71 transports the fed object to be read at a constant transportation speed along the transporting path 32 in accordance with a reading condition.

The reading control unit 73 controls emission of the light source 41 through a light source driving unit and irradiates a reading area of the document D with light. During this transportation, the reading control unit 73 controls the reading unit 40 through the TG 64 so as to read an image of the document D. An analog image signal read by the reading unit 40 is converted into a digital signal by the AFE 65 and is input to the image processing unit 74. The image processing unit 74 performs a known correction process such as a shading correction and a gamma correction on the input digital image signal and generates image data of the document D.

Each process (each function) of the embodiment being performed by the processing unit 60 can be realized by a processor (processor including hardware). For example, each process of the embodiment can be realized by a processor, which is operated based on information such as a program, and a memory (storage unit) which stores information such as a program. Here, regarding the processor, for example, each function may be realized by an individual hardware or may be realized by one hardware. For example, the processor includes hardware, and the hardware is capable of including at least one of a circuit which processes a digital signal and a circuit which processes an analog signal. For example, the processor can be constituted by one or a plurality of circuit equipment (for example, IC or the like) mounted on a circuit substrate, or one or a plurality of circuit elements (for example, resistors, capacitors, and the like). The processor may be, for example, a CPU. However, the processor is not limited to the CPU, and various processors such as a graphics processing unit (GPU) or a digital signal processor (DSP) can be used as the processor. In addition, the processor may be a hardware circuit constituted by an ASIC. Also, the processor may be constituted by a plurality of CPUs, or may be constituted by a hardware circuit which is constituted by a plurality of ASICs. In addition, the processor may be configured by combining the plurality of CPUs and the hardware circuit which is constituted by the plurality of ASICs.

The storage unit 61 (storage or memory) stores various information pieces such as data or programs. The processing unit 60 is, for example, operates the storage unit 61 as a work area. The storage unit 61 may be a semiconductor memory such as a static random access memory (SRAM) or a dynamic random access memory (DRAM), may be a resistor, may be a magnetic storage unit such as a hard disk device (hard disk drive (HDD)), or may be an optical storage unit such as an optical disk device. For example, since the storage unit 61 saves commands readable by a computer, when the command is executed by the processing unit 60 (processor), a function of each unit of the image reading apparatus 11 is realized. Here, the command may be a command of a command set constituting a program or may be a command of instructing the processing unit 60 (processor) of an operation with respect to a hardware circuit.

The image reading apparatus 11 is connected to the host device 100 through a communication cable. The host device 100 is configured as, for example, a personal computer (hereinafter, referred to as "PC"), and includes an inputting unit 101 and a display unit 102. Also, the host device 100 is not limited to the PC, and may be a smart device such as a mobile information terminal (personal digital assistants (PDA)), a tablet PC, or a smart phone.

As illustrated in FIG. 4, the host device 100 is equipped with a processing unit (processor) 103 and a storage unit (memory) 104 therein. Each process (each function) of the embodiment being performed by the processing unit 103 can be realized by a processor (processor including hardware). For example, each process of the embodiment can be realized by a processor, which is operated based on information such as a program, and a storage unit (memory) which stores information such as a program.

A user operates the inputting unit 101 and sets setting conditions (task conditions) relating to the image reading process. The setting conditions includes a reading condition including read resolutions, read colors, single-side reading and double-side reading, and the like, an image processing condition including the shading correction, the gamma correction, or the like, and a storage condition including storage formats, transmission methods, and storage destinations of image data.

In the image reading apparatus 11 of the embodiment, regarding the reading resolutions, for example, there are 300 dpi and 600 dpi, and regarding the read colors, there are monochrome (grayscale) and colors. Regarding the storage formats, there are a PDF format, a JPEG format, a GIF format, and the like. In addition, regarding the transmission methods, there are a transmission to the host device 100, a transmission to an external storage unit, and a mail transmission, and regarding the storage destinations, a folder address in the storage unit 104 inside the host device 100, an address for designating the external storage unit, or a mail address of a mail transmission destination, is designated. Also, the setting condition may be set by a user when the user operates the operating unit 20 of the image reading apparatus 11.

2. First Embodiment

Figure 5:
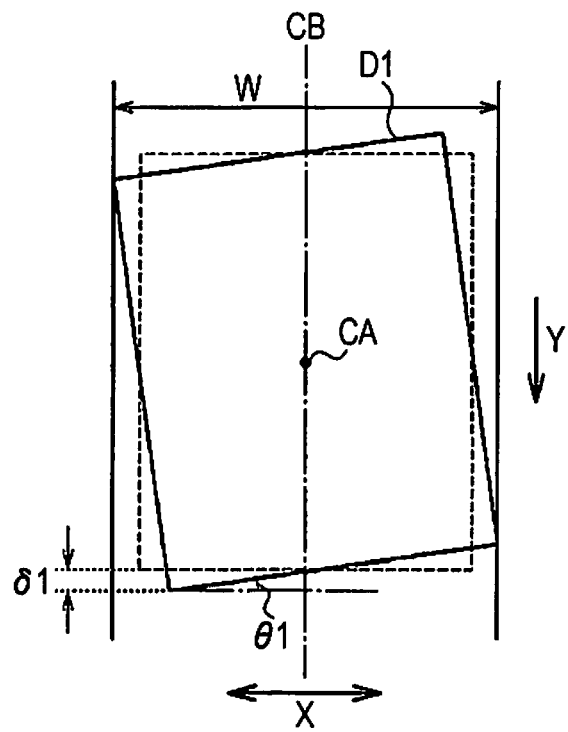
FIG. 5 is a schematic view illustrating a relationship between a document and a transporting path in a case in which the document having a relatively great size is inclined.
Figure 6:
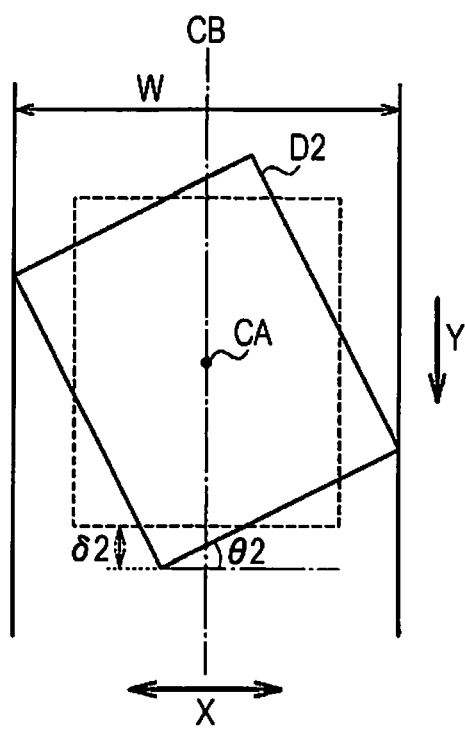
FIG. 6 is a schematic view illustrating a relationship between the document and the transporting path in a case in which the document having a relatively small size is inclined.

FIG. 5 is a description view of a position relationship between the transporting path 32 and a document D1 in a case in which the document D1 having a relatively great size is inclined, and FIG. 6 is a description view of a position relationship between the transporting path 32 and a document D2 in a case in which the document D2 having a relatively small size is inclined. In FIGS. 5 and 6, W indicates a length of the transporting path 32 in the width direction (X direction), and in a case in which the document D is present within a range illustrated by W, the document D is transported without receiving interference of the edge guide 17 or the like.

Hereinafter, a case, in which a center of the width direction of the document D is moved along a center of the width direction of the transporting path 32, is exemplified. In order to simplify description thereof, the center of the width direction is described appropriately as a width center. Also, a width center of the document D and a width center of the transporting path 32 substantially match with each other, but are not limited to complete matching. In addition, a case, in which deviations of the width center of the document D and the width center of the transporting path 32 are generated, will be described later as a modification example.

As illustrated in FIG. 5, in order to suppress interference being generated due to inclination, a tilt angle allowed for the document D1 is set to θ1 or less. Here, the tilt angle is an angle of the inclined document when a state in which inclination is not generated (broken line in FIG. 5) is set to a reference. With respect to that, as illustrated in FIG. 6, a tilt angle allowed for the document D2 having a relatively small size is set to θ2, and θ2 is greater than θ1.

Figure 7:
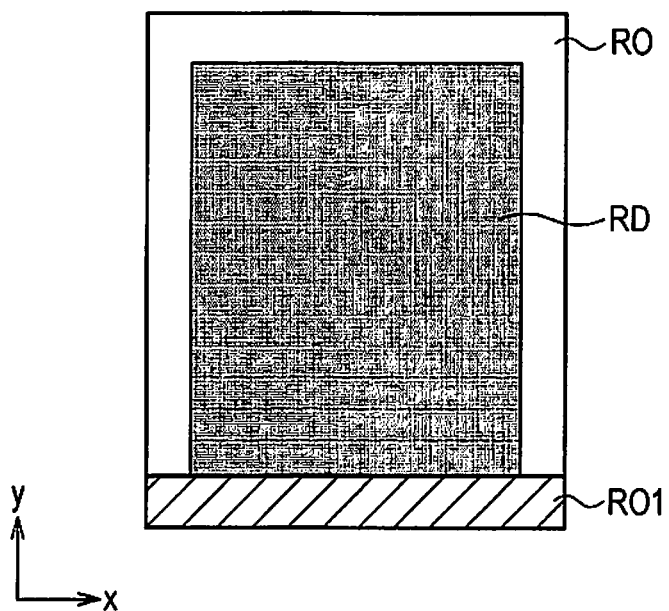
FIG. 7 is a view illustrating an example of image data in a case in which the document is not inclined.

In the method disclosed in JP-A-2012-99947, a difference of the document sizes is not considered. Therefore, for example, it is also determined that the document D2 having a relatively small size is inclined at the tilt angle corresponding to θ1. A problem in the embodiment is a damage of a document due to inclination, but the inclination itself is often not a problem if the document is inclined so as not to be damaged. For example, according to the image reading apparatus 11, as illustrated in FIG. 7 or the like to be described later, a greater area than an initial document size is read, the image data is generated, and an area in which an image of the document is actually present is taken out from the image data, or tiling thereof is corrected. In the image reading apparatus 11, if the document is inclined so as not to be damaged, a desired image data can be output by a tilting correction process or the like.

That is, in the method disclosed in JP-A-2012-99947, there is a concern that the operation may be stopped even in a situation in which an original operation is not needed to be stopped. According to examples of FIGS. 5 and 6, in a case in which the document D2 is scanned, if an angle thereof is the tilt angle θ in which θ is smaller than θ2, there is no problem even when the document is inclined at the tilt angle greater than θ1, but there is a concern that the operation may be stopped in the method disclosed in JP-A-2012-99947. Particularly, a document which has a small and thick size like a card, inclination is easily generated compared to a thin document. In a case in which the method disclosed in JP-A-2012-99947 is applied for the document such as a card, in a situation in which the document has a small size and the inclination does not become a problem, there is a concern that the operation may be frequently stopped and it is inefficient.

The transporting apparatus according to the embodiment includes the transporting mechanism 31 which transports the document along the transporting path 32 and the processing unit 60 which determines an inclination error of the document. In a case in which the document size of the document is equal to or greater than a threshold, the processing unit 60 determines that an inclination error occurs at a tilt angle which is a tilt angle smaller than that in a case in which the document size is smaller than the threshold. Here, the inclination error indicates that an operation (in a narrow sense, transporting operation) of the transporting apparatus is not needed to be continuously performed because of the inclination, in a narrow sense, the inclination error indicates a high possibility that the paper jam may be generated.

As described above, when the tilt angle, which is determined to cause generation of the inclination error in accordance with the document size, is changed, it is possible to suppress stop of the transporting operation in a situation in which the transporting operation is not needed to be stopped.

Also, here, the threshold can be variously set. For example, the threshold is one type, and the document size may be divided into two stages by the threshold. Hereinafter, the threshold is a threshold capable of identifying a document of B5 (182 mm×257 mm) or more and a document of less than B5, and an example, of which an angle threshold (information used for comparison with tilt angle) being used for an inclination error determination of the document having a B5 size or more and the document having a less than B5 size is switched, will be described. In an A4 scanner which is widely used, A4 and B5 documents are assumed as the document having a B5 size or more, and a document such as an A5, a postcard, or a card is assumed as the document having a less than B5 size.

However, when values of two types or more are set as the threshold, the document size is divided into three stages, and three or more angle thresholds may be switched. Otherwise, a function f associating the angle threshold and the document size may be set. In a case in which the angle threshold is set to $\theta_{Th}$, and the document size is set to s, a relationship thereof is expressed as $\theta_{Th}=f(s)$. Here, f is a function of which a value of $\theta_{Th}$ is simply reduced as a value of s becomes great.

The transporting apparatus of the embodiment further includes a sensor which detects the tilt angle and the document size of the document transported by the transporting mechanism 31. That is, in a first embodiment to be described hereinafter, when the document size and the tilt angle are obtained based on a detected result of the sensor, in a case in which the document size is greater than the threshold, as compared to a case in which the document size is smaller than the threshold, a process of determining that the inclination error has occurred at a small tilt angle is realized.

Here, the sensor is, for example, an image sensor (reading unit 40, in a narrow sense, image sensor 42) which reads an image of the document in a reading area on the transporting path and outputs image data. The reading area is specifically an area where the image sensor is provided and is a strip-shaped area (rectangular shape having a long line in X direction) illustrated by 40 in the example of FIG. 3.

The image sensor of the embodiment reads an area greater than the assumed document at the time of scanning. This part is referred to as an over-scan area hereinafter. The over-scan area may be considered as an area where data of the document does not present at the time of an ideal transportation state of which inclination is not generated.

FIG. 7 is a view illustrating an example of the image data being output from the image sensor when the inclination is not generated. Also, in FIG. 7, a lower side of a drawing thereof means an area being firstly read by the image sensor, that is, an area corresponding to a downstream side of the transporting path 32, and this point is also the same as that in FIG. 8 or the like. In addition, the image data used for the inclination error determination may be the same as the image data being output to an external device (host device 100 or the like) as a scanned result, but it is not limited thereto. For example, in a case in which a resolution of the image data being output to the host device 100 is 300 dpi or 600 dpi, the image data for the inclination error determination is an image having a lower resolution (for example, 75 dpi) than the resolution described above.

In FIG. 7, an area illustrated by RD is an area where the document is read (hereinafter, document area). Detection of the document area RD from the image data can be realized by the same configuration as a separation process or a tilt correction of the related art. As illustrated in FIG. 2, the color reference plate 43 is provided on an irradiation direction side of the light source 41, and the color reference plate 43 is a different color (for example, gray) from a basic color (for example, white) of the document. Accordingly, the processing unit 60 determines whether or not each pixel of the image data is the same color as that of the color reference plate 43 so that the document area RD can be detected from the image data.

According to a configuration illustrated in FIG. 3, the processing unit 60 starts, for example, to read a document using the reading unit 40 at a timing when the document sensor 48 detects the document. In this way, since a leading edge portion of the document is expected to start to be read before reaching the reading unit 40, it is possible to set an over-scan area on a downstream side (leading edge side, Y direction side) of the document. In addition, the processing unit 60 causes the reading unit 40 to continuously read the document until the document is transported by a predetermined amount even after the document sensor 48 does not detect the document. In this way, it is possible to set the over-scan area on an upstream side of the document. In addition, in the width direction (direction intersecting transporting direction, X direction) of the transporting path 32, an image sensor greater than a size (for example, the maximum document size that the image reading apparatus 11 corresponds to) of the assumed document is set. In this way, it is possible to set the over-scan area on right and left sides (width direction, X direction) of the document.

As illustrated in FIG. 7, in a case in which a normal feeding is performed without generation of inclination, the color reference plate 43 is uniformly read in upper, lower, right, and left directions thereof, and data corresponding to the document is not present in an over-scan area RO. Also, as illustrated in FIG. 7, hereinafter, an area on a leading edge side in the over-scan area RO is written as RO1.

Figure 8:
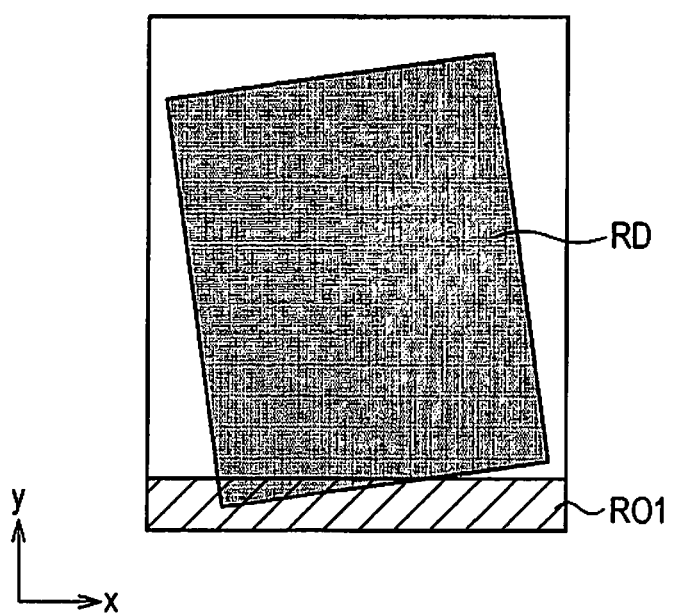
FIG. 8 is a view illustrating an example of the image data in a case in which the document is inclined.

FIG. 8 is a view illustrating an example of the image data being output from the image sensor at the time of generating inclination. In a case in which the inclination is generated, the leading edge portion of the document (a side on a downstream side of the transporting path 32 among sides of the document D) is not perpendicular to the transporting direction (Y direction). Accordingly, one side of right and left sides of the leading edge portion of the document (left side in example of FIG. 8) reaches the reading unit 40 earlier than that when the inclination is not generated, and the other side of the right and left sides of the leading edge portion thereof (right side in example of FIG. 8) reaches the reading unit 40 later than that when the inclination is not generated. Therefore, in a case in which the inclination is generated, reading is obliquely performed as FIG. 8, and document data is present in the over-scan area RO (particularly, leading edge side, RO1 which is an area on a downstream side).

Accordingly, the processing unit 60 determines the inclination error based on data of an area RA, which is an area to be determined, including the over-scan area RO1 on the leading edge side in the image data. As illustrated in FIGS. 7 and 8, it is different whether the document area RD is present or absent in the over-scan area RO depending on generation of the inclination. Accordingly, a use of the over-scan area RO is effective to determine the inclination error. Further, when the area RA to be determined including the over-scan area RO1 on the leading edge side (corresponding to downstream side of transporting path 32) of the document is used for the inclination error determination, as compared to a case in which the over-scan area on an opposite side (upstream side) is used or the like, it is possible to determine the inclination error at an early timing. Since the determination can be performed in a stage where a transported amount of the document is small, before the paper jam is generated (before the document is damaged), it is possible to improve a probability that a transporting operation can be stopped.

Specifically, the processing unit 60 obtains the document size and the tilt angle based on data of the area RA to be determined, the inclination error is determined by a comparison process between an angle threshold set in accordance with the document size and a tilt angle. Hereinafter, based on the image data (data of area RA to be determined), a method of calculating the document size and the tilt angle will be described.

Figure 9:
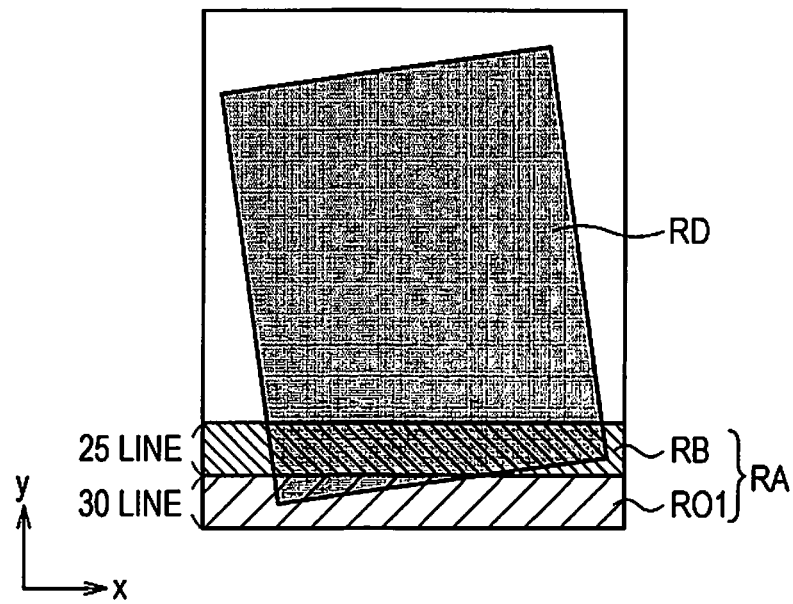
FIG. 9 is a description view of an area to be determined.

FIG. 9 is a view illustrating a specific example of the area RA to be determined including the over-scan area RO1. The area RA to be determined is an area including the over-scan area RO1 set on the leading edge side, and an area RB which is adjacent to the over-scan area RO1 and is a part of an area of the image data on an upstream side of the over-scan area RO1. For example, in a case in which a width of the image data including right and left over-scan areas is set to 640 pixels, the number of pixels of the over-scan area RO1 on the leading edge in the transporting direction is 30 pixels. Also, the area RA to be determine is an area of 640 pixels×55 pixels including the over-scan area RO1 and an area of 25 pixels (RB). However, since the specific number of pixels varies depending on setting of resolutions, an area having a different size from 640 pixels×55 pixels may be set as the area RA to be determined. The area of 25 pixels is added because feature points (P1 and P2) are reliably detected at the time of calculating the document size. Details thereof will be described later. Hereinafter, a right direction of the image data (area to be determined) is set to an x-axis positive direction, and an upper direction thereof is set to a y-axis positive direction. A y axis direction (specifically, y-axis negative direction) corresponds to the transporting direction Y, and an x axis direction corresponds to the main scanning direction (width direction) X. In addition, it will be described that right and left sides of the area RA to be determined are set to original points (x, y) (0, 0), and a coordinate of points on a right upper side is set to (x, y) (639, 54). Hereinafter, in order to simplify description thereof, (x, y) (a, b) is simply referred to as (a, b).

Figure 10:
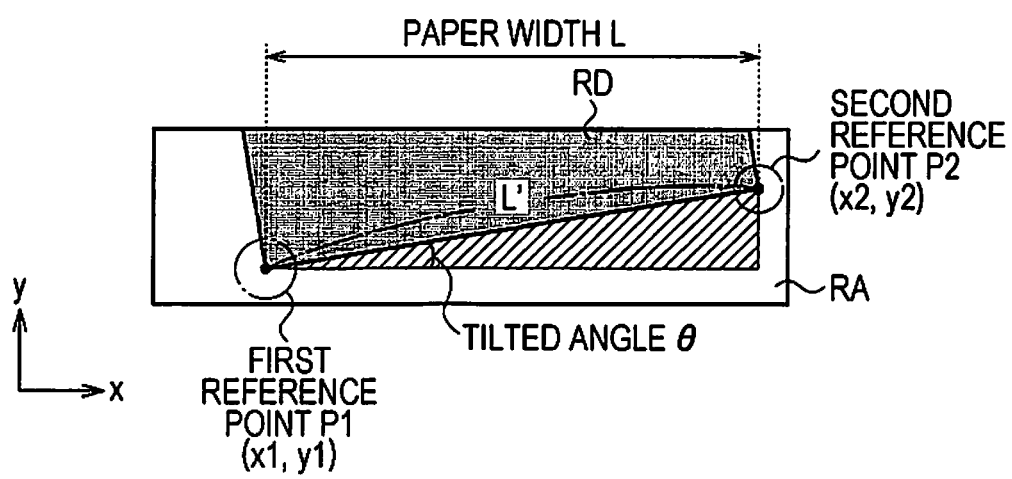
FIG. 10 is a view for describing a calculation process based on data of the area to be determined.

FIG. 10 is a diagram illustrating an enlarged area RA to be determined of FIG. 9. The processing unit 60 determines whether or not data of the document is present line by line from the original points. For example, when a first one line is determined, with respect to 640 pixels of (0, 0) to (639, 0) as a target, the processing unit determines whether or not there is the data of the document (whether or not the data is present in the document area RD). Hereinafter, until a first data piece of the document is detected, the same process is performed on a second line (0, 1) to (640, 1) and lines subsequent thereto.

In a case in which the data of the document is detected in a certain line, the line is a reference line. Hereinafter, a y coordinate value in the reference line is set to y1. The processing unit 60 checks the reference line (0, y1) to (640, y1), and sets a coordinate (x1, y1), where the first data piece is present in the x axis direction, to a first reference point P1. As seen from FIG. 10, the first reference point P1 is an end point on any one of right and left sides in the leading edge portion of the document.

When the first reference point P1 is found, the data of the document is considered to be present on an upper side of y1 (y axis positive direction side). Accordingly, the processing unit 60 detects one line, where the data of the document in one line becomes the maximum, and sets the line as y2. The data of the document in the one line indicates a width of the data of the document in the line in the x axis direction, and the width corresponds to a different value between a minimum value and a maximum value of an x coordinate value in which the data of the document in the line is present. As seen from FIG. 10, in a case in which scanning is performed line by line, a line where the data of the document of the first one line becomes the maximum is a line including a second reference point P2 (x2, y2). The second reference point P2 is an end point on the other side of the first reference point P1 in the leading edge portion of the document. Also, in a line of y2, two boundary coordinates of the document D and a background plate (color reference plate 43) are present. The processing unit 60 sets a coordinate which is distant away from the first reference point P1 between two boundary points to (x2, y2).

With the process described above, since two reference points can be detected, the processing unit 60 calculates the document size and the tilt angle. Here, the document size is specifically a paper width L. Paper, which is generally used, has a determined ratio (aspect ratio) of a length and a width, for example, the ratio is √2:1, and the document is usually set to be vertically long. That is, even when any one of the length and the width is only used to be set as the document size so as to be difficult to be a cause of a problem of the inclination error determination, and here, the paper width L is calculated.

The processing unit 60 calculates the paper width L using Expression (1) to be described as follows. As seen clearly from FIG. 10, since the document D is inclined, L is not an accurate width. However, in the embodiment, as illustrated in a flow chart of FIG. 11, it is good as long as a size equal to or greater than B5 and less than B5 can be identified. A paper width (corresponding to L of FIG. 10) when a document having B5 size is inclined at 20 degrees is 171 mm, and a width of a document having A5 size (corresponding to paper width L in a state of not being inclined) is 148 mm. That is, even when an error has occurred due to inclination is considered, it is possible to reliably identify a size equal to or greater than B5 and less than B5 by Expression (1) as follows. However, calculation of an accurate document width (L' of FIG. 10) can be modified.

$$L=|x2-x1| \qquad (1)$$

In addition, the processing unit 60 calculates the tilt angle (inclined angle or skewed angle) θ by Expression (2).

$$\theta=a\tan((y2-y1)/(x2-x1)) \qquad (2)$$

The processing unit 60 sets an angle threshold (error angle) in accordance with the paper width L calculated by Expression (1), and compares the angle threshold with the tilt angle θ calculated by Expression (2). Also, in a case in which the tilt angle θ is greater than the angle threshold, the processing unit determines that there is a possibility of generation of the paper jam so as to stop scanning (image reading operation, in a narrow sense, transporting operation).

Figure 11:
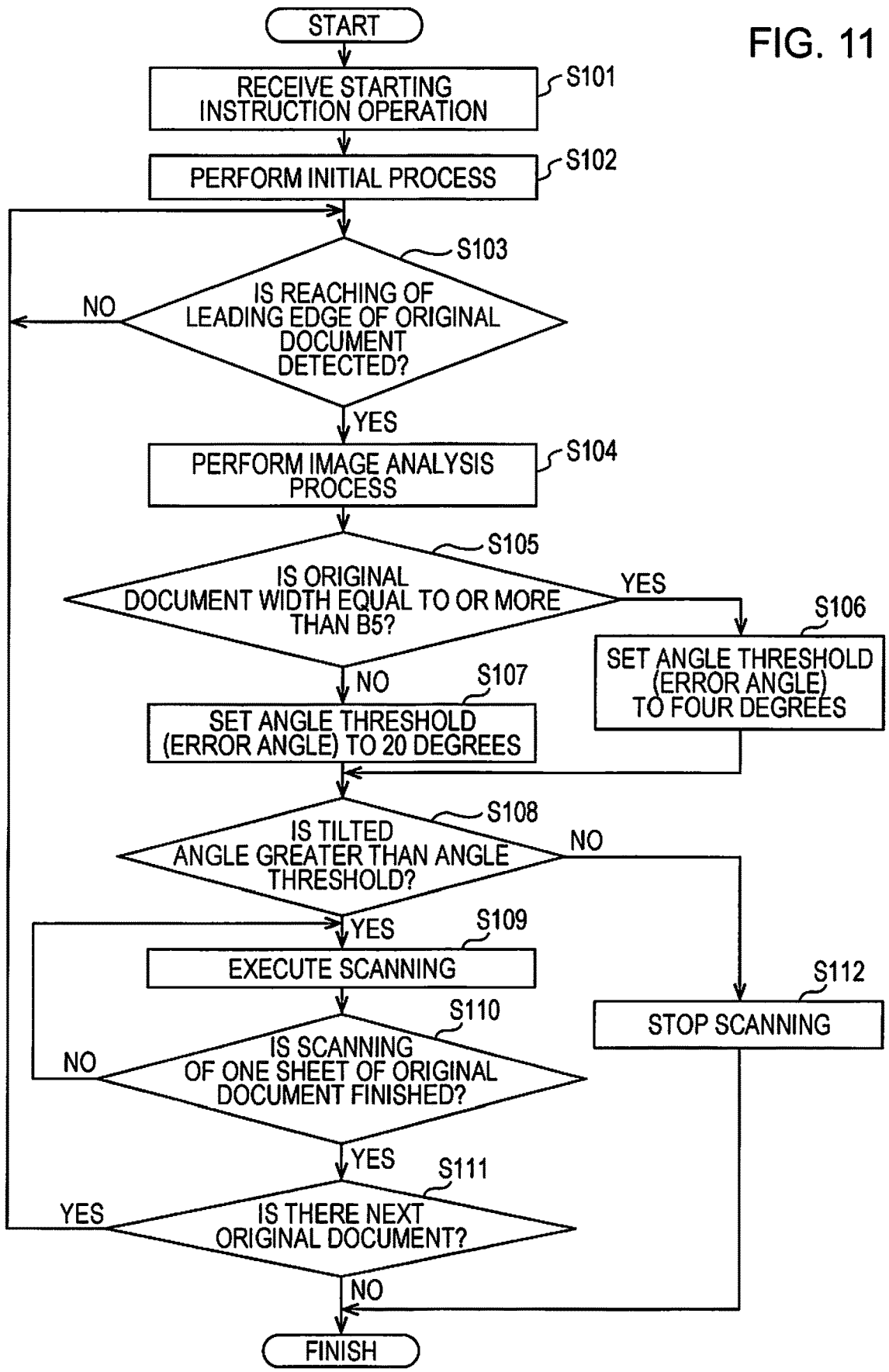
FIG. 11 is a flow chart describing processes of a first embodiment.

FIG. 11 is a flow chart describing processes of the embodiment. When a user sets the document and instructs start of scanning (S101), a process is started. First, an initial process is performed (S102). In the initial process, a process of acquiring the white reference value for shading correction using the color reference plate 43 is included. Subsequently, a first sheet is separated from the documents, and the first sheet of the documents is started to be transported. A leading edge of the first sheet of the documents reaches a position of the document sensor 48, and scanning is started by pressing a lever (Yes in S103). Then, the first sheet of the documents is transported and scanned, an image for analysis is created by deteriorating resolution from a read image, and an image analysis process is executed on the image for analysis (S104). Specifically, as described above, the data of the area RA to be determined is analyzed line by line, and detection of the first reference point P1, detection of the second reference point P2, calculation of the paper width L, and calculation of the tilt angle θ are performed. Also, the image analysis process of S104 may be executed when all image data pieces (data pieces in 55 lines) of the area RA to be determined are acquired, or may be sequentially executed at a timing when a part of the data piece in the area RA to be determined (for example, data piece of one line) is acquired.

Next, the processing unit 60 determines whether or not the document size is equal to or greater than B5 based on the calculated paper width L (S105). According to the example described above, a threshold is set between 171 mm and 148 mm, and whether or not the calculated paper width L is equal to or greater than the threshold may be determined. However, since L does not indicate an actual length but indicates the number of pixels, a process of converting L into a length is performed, or the threshold is desirably set to the number of pixels instead of the length.

In a case in which the document size is equal to or greater than B5 (Yes in S105), a relatively small angle threshold is set, such that the inclination error can be determined even at the tilt angle which is relatively small. Here, the angle threshold is set to four degrees (S106). In a case in which the document size is less than B5 (No in S105), a relatively great angle threshold is set, such that the inclination error is not determined if the tilt angle is relatively great. Here, the angle threshold is set to 20 degrees (S107).

The processing unit 60 compares the angle threshold set in S106 or S107 with the tilt angle θ calculated in S104 (S108). In a case in which the tilt angle is smaller than the angle threshold (Yes in S108), it is possible to determine that the tilt angle is not great as the paper jam is generated, and thus scanning is continuously performed (S109). When a trailing edge of the first sheet of the documents passes through a position of the document sensor 48, and the first sheet of the documents is finished to be scanned by receiving transportation of the document by a predetermined distance after a lever returns (Yes in S110), the document sensor 45 determines whether or not a next document is present (S111). In a case in which the next document is present (Yes in S111), the process returns to S103, and detection of reaching of the next document and the inclination error determination are started. In a case in which the next document is not present (No in S111), an image process such as shading correction, cutout, rotating of the document image read by scanning is performed, and the image data is output as a designated format such as PDF, then the process is finished.

In addition, in a case in which the tilt angle is greater than or equal to the angle threshold (No in S108), since it can be determined that the tilt angle has a high possibility of generation of the paper jam in some degree, the scanning is immediately stopped (S112), it notifies the user about a fact of a skewing document, and the process is finished. Also, it does not matter that the process can be started again when the user corrects the skewing.

3. Second Embodiment

As illustrated in FIGS. 5 and 6, a position of the document (broken line) in a case in which inclination is not generated and a position of the document in a case in which the inclination is generated (solid line) are different from each other. For example, in a case in which a center (gravity center) of the document matches with the center as illustrated in FIGS. 5 and 6, when the inclination is generated, a part of the leading edge of the document protrudes to a downstream side of the transporting path 32 (Y direction side) compared when the inclination is not generated. The most protrusion part to the downstream side is an apex (end point of any one of right and left sides of the leading edge of the document) of the document. Also, if the document sizes are constant, a protrusion degree (protruded amount in Y direction) of the apex to the downstream side becomes greater, as the tilt angle A increases due to the inclination.

Accordingly, in the embodiment, the processing unit 60 compares a predicted position corresponding to the position of the leading edge of the document D in a case in which the inclination is not generated with an actual position of the leading edge of the document D transported by the transporting mechanism 31, and in a case in which the actual position is deviated from the predicted position by a predetermined threshold or more on a downstream side of the transporting path 32, the inclination error is determined to occur.

The position of the document in a case in which the inclination is not generated is already known because of design of the transporting apparatus. For example, in the image reading apparatus 11 of FIG. 3, according to the example in which a position at a timing when the document sensor 48 detects the document is set to the predicted position, the predicted position is a position of the document sensor 48 regardless of a position in the width direction (X direction).

According to the method of the embodiment, when a certain sensor detects the actual position of the leading edge of the document D, and the actual position and the predicted position are compared with each other, the inclination error can be determined. In the embodiment, since calculation of the tilt angle θ or the like is not necessary as the first embodiment, it is possible to reduce a process load.

However, in order not to stop the transportation operation in a situation where a necessity to stop the operation is low, an allowable value (angle threshold, error angle) of the tilt angle in accordance with the document size is necessary to be changed even in the embodiment. According to the examples of FIGS. 5 and 6, in the document D1 having a relatively great size, a deviation amount of the apex of thereof with respect to the predicted position is necessary to be set to be less than 81, and in the document D2 having a relatively small size, the deviation amount of the apex of thereof with respect to the predicted position is necessary to be set to be less than 82.

Here, as seen from the comparison of FIGS. 5 and 6, in a case in which the width center of the document is transported along the width center of the transporting path 32, a position (x coordinate) in the width direction of the apex protruding in Y direction is relatively close to the end portion of the transporting path 32 if the document size is great, but is relatively close to the center portion of the transporting path 32 if the document size is small.

Here, in the embodiment, in the determination of the inclination error, a value of a predetermined threshold being used for comparing a deviation amount between the actual position and the predicted position is changed in accordance with a position of the transporting path 32 in the width direction. Specifically, a first threshold, which is a predetermined threshold at a first position of the transporting path 32 in the width direction, is smaller than a second threshold which is a predetermined threshold at a second position which is a position closer to an end portion side than the first position of the transporting path 32 in the width direction. In this way, an allowable deviation amount (protruded amount to downstream side) is changed in accordance with the document size. As a result, in a case in which the document size is equal to or greater than the threshold, a process of determining that the inclination error has occurred at a small tilt angle as compared to a case in which the document size is smaller than the threshold.

As described above, in the embodiment, since both a position in the width direction (X direction) and a position in the transporting direction (Y direction) are needed to be considered, a process is performed two-dimensionally (on XY plane). Specifically, on the XY plane, an area where the apex of the document D is present in a case in which the tilt angle θ is less than the angle threshold (inclination error does not occur), and an area where the apex of the document D is present in a case in which the tilt angle θ is equal to or greater than the angle threshold (inclination error occurs) are distinguished. In a broad sense, on the XY plane, an area, where the document D is present in a case in which the inclination error does not occur, and an area, where the document D cannot be present if the inclination error does not occur, are distinguished. Also, the inclination error is determined in accordance with whether or not the document D is present in the area where the document D cannot be present if the inclination error does not occur.

In a case in which the transporting apparatus is the image reading apparatus 11, the position of the document in an actual space is capable of associating with the position of the document data on the image data output by the image sensor. That is, in the method of the embodiment, direct determination of the position (area) where the document is present in the actual space is not limited, and may be determination of the position (document area RD) of the document data in the image data. That is, the transporting apparatus (image reading apparatus 11) further includes an image sensor (reading unit 40, image sensor 42) which outputs image data by reading an image of the document in the reading area on the transporting path 32. Also, the processing unit 60 detects the actual position of the leading edge of the document D based on the image data, and determines the inclination error based on the detected actual position.

In a case in which the document D is inclined due to a certain reason, the document D is read at a part where the document D does not normally come. That is, in a case in which the inclination is generated, the document data is present in the over-scan area RO (particularly, RO1 on the leading edge side) described even in the first embodiment. The processing unit 60 determines that the inclination error has occurred in a case in which the document D (document area RD) is present in an inclined area RS in the over-scan area RO1 on a leading edge side of the image data. Here, the inclined area RS corresponds to an area in the over-scan area RO1 where the document D is not present if the inclination error does not occur. The inclined area RS is an area corresponding to the first threshold and the second threshold, and for example, is an area set in advance based on the first threshold and the second threshold. Hereinafter, an example of a setting method of the inclined area RS will be described.

Figure 12:
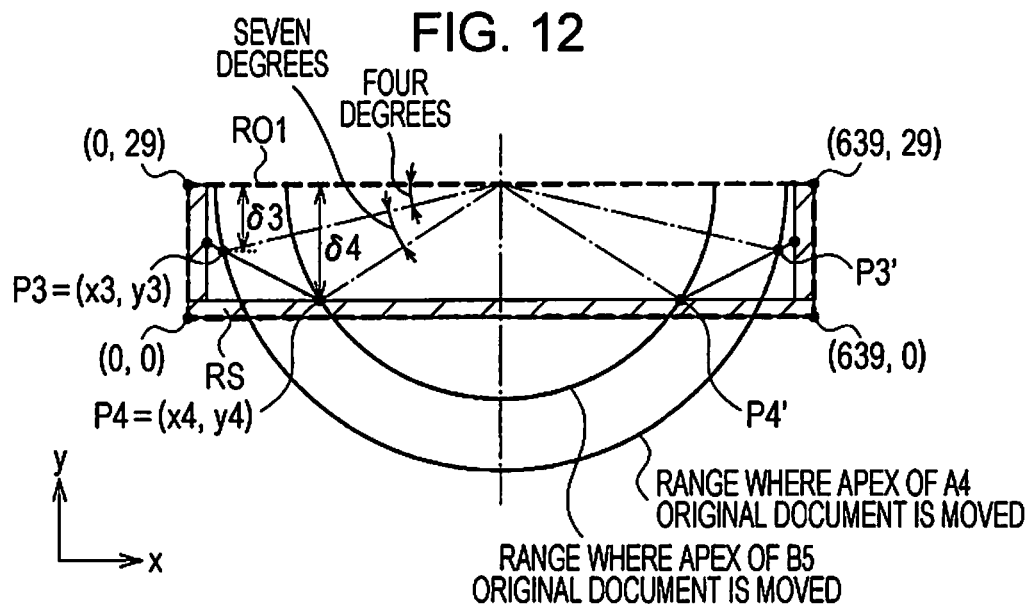
FIG. 12 is a view for describing a setting method of an inclined area.

FIG. 12 is a diagram for describing the inclined area RS. In a case in which a document in A4 size and a document in B5 size are inclined, an area through which the apexes of the documents D pass is illustrated in FIG. 12. Also, FIG. 12 illustrates an example in which a rotation center is set to be the leading edge portion of the document D and the center of the width direction, but as illustrated in FIG. 5 or the like, the center of the entire document may be considered as the rotation center. In addition, in FIG. 12, in order to easily understand setting of the inclined area RS, an angle or a scale is extremely expressed.

A maximum value (angle threshold) of the tilt angle θ being allowed for the document D in A4 size is, for example, four degrees, and a maximum value (angle threshold) of the tilt angle θ being allowed for the document D in B5 size is, for example, seven degrees. In FIG. 12, the apex when the document D in A4 size is inclined at four degrees is P3=(x3, y3), and the apex when the document D in B5 size is inclined at seven degrees is P4=(x4, y4). A position (x3) of P3 in the width direction corresponds to the second position, and a position (x4) of P4 corresponds to the first position. In addition, a distance (δ3) to y3 from an upper end (y=29) in the over-scan area RO1 corresponds to the second threshold, and a distance (δ4) to y4 corresponds to the first threshold. Here, an outside (leading edge side, downstream side) of P3 and P4 is set in the inclined area RS, and in a case in which the document D reaches the inclined area RS, the document D is determined to be damaged so as to stop the transporting operation.

In addition, regarding the document D having a size between A4 and B5, a maximum value of the allowable tilt angle θ is considered to an angle between four degrees to seven degrees. Accordingly, here, in conjunction with P3 and P4, an outside thereof is set in the inclined area RS.

In addition, hitherto, the inclined area RS on the left side in the over-scan area RO1 is described, but the inclined area RS on the right side can also be considered as same as the inclined area on the left side. Specifically, regarding the apex on the right side of the leading edge of the document D, the inclined area RS may be set based on an apex (P3') when the document D in A4 size is inclined at four degrees and an apex (P4') when the document D in B5 size is inclined at seven degrees. As described above, the inclined area RS is linearly symmetric area with the width center of the transporting path 32 as a symmetry axis. In this way, regardless of a rotation direction when the document D is inclined, it is possible to perform an appropriate inclination error determination.

In addition, in a case in which the document D having a predetermined pixel on right and left ends and a lower end of the over-scan area RO1 is detected, it is determined that the tilt angle θ is abnormally great. Here, a predetermined pixel is, for example, one pixel. Accordingly, a vertical first line of x=0, a vertical first line of x=639, and a horizontal first line of y=0 are also set in the inclined area RS.

As seen from the description above, the first threshold (corresponding to δ4) described above is a threshold set based on a position of the leading edge of the document in a case in which a first document having a relatively small document size is inclined by a first tilt angle, and the second threshold (corresponding to δ3) is a threshold set based on the position of the leading edge of the document in a case in which the second document having a document size greater than the first document is inclined by a second tilt angle smaller than the first tilt angle. In the example described above, the first document has a B5 size, the second document has an A4 size, the first tilt angle is seven degrees, and the second tilt angle is four degrees. However, each of the thresholds and specific examples of the document size and the tilt angle θ can be variously modified. In addition, hitherto, the example of which the inclined area RS is set based on the two thresholds is described, but the inclined area RS may be set using three or more thresholds.

Figure 13:
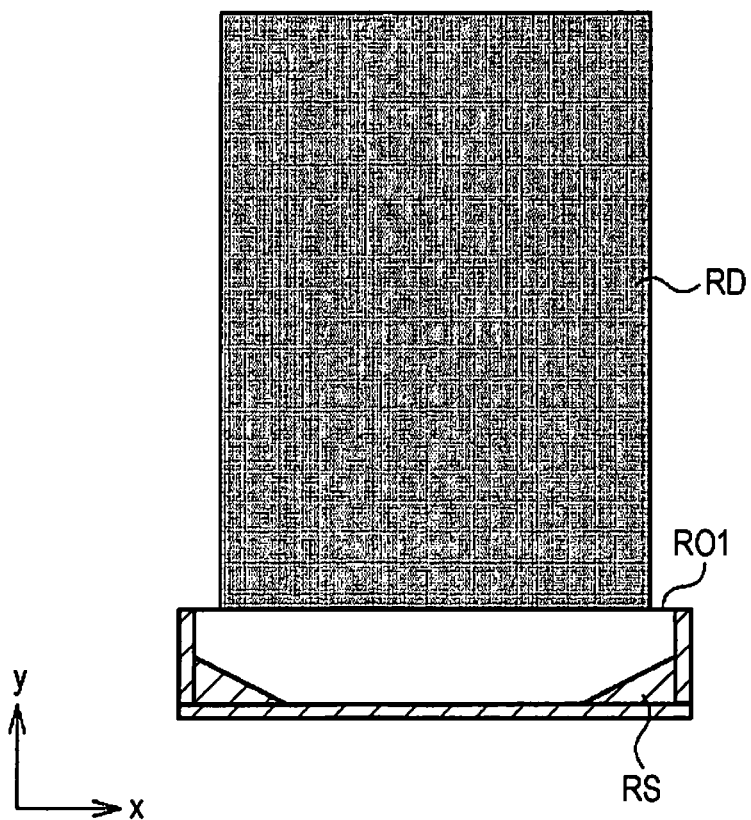
FIG. 13 is a view illustrating a relationship example of a document area and the inclined area in a case in which there is no inclination.
Figure 14:
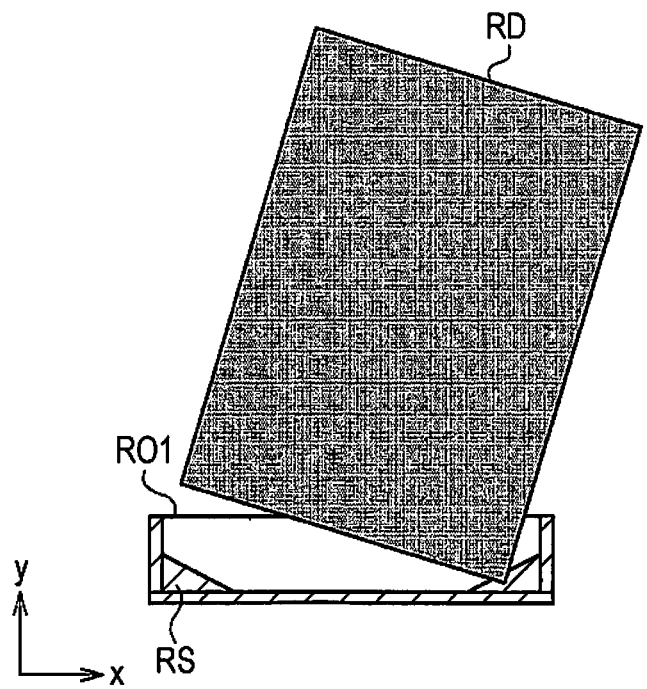
FIG. 14 is a view illustrating a relationship example of the document area and the inclined area in a case in which the document having a relatively great size is inclined.
Figure 15:
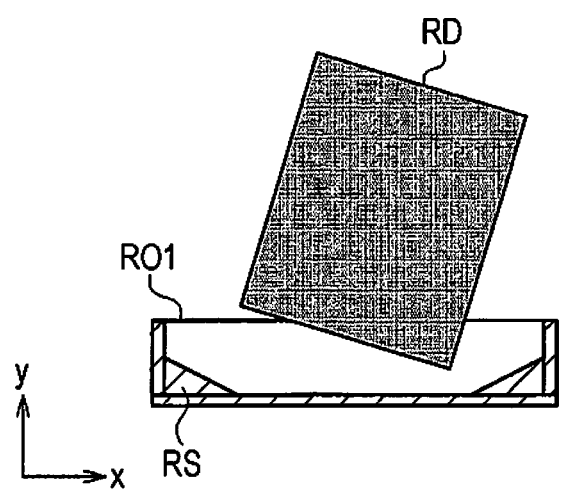
FIG. 15 is a view illustrating a relationship example of the document area and the inclined area in a case in which the document having a relatively small size is inclined.

FIGS. 13 to 15 are views illustrating relationship examples of the document area RD and the inclined area RS. FIG. 13 illustrates an example of a case in which the document D is not inclined. If the document is not inclined, as illustrated in FIG. 13, the document area RD is not present in the over-scan area RO1, and it is determined that the inclination error does not occur.

FIG. 14 illustrates an example of which the document D having a relatively great size (for example, A4 size) is inclined, and the inclined area RS and the document area RD partially overlaps with each other. Accordingly, in this case, since the document is present in the inclined area RS, the inclination error is determined to occur. FIG. 15 illustrates an example in a case in which the document (for example, postcard size) having a relatively small size is inclined. In the example of FIG. 15, the tilt angle θ itself is great at the same degree as that of FIG. 14, but the document size is small, and thus interference with the edge guide 17 or the like does not occur. In a case of FIG. 15, the document area RD is present in the over-scan area RO1, but the document area RD is not present in the inclined area RS. Accordingly, it is possible to determine that the inclination error does not occur.

As illustrated in FIGS. 13 to 15, when using the inclined area RS of FIG. 12, it is possible to realize an appropriate inclination error determination in accordance with the document size.

Figure 16:
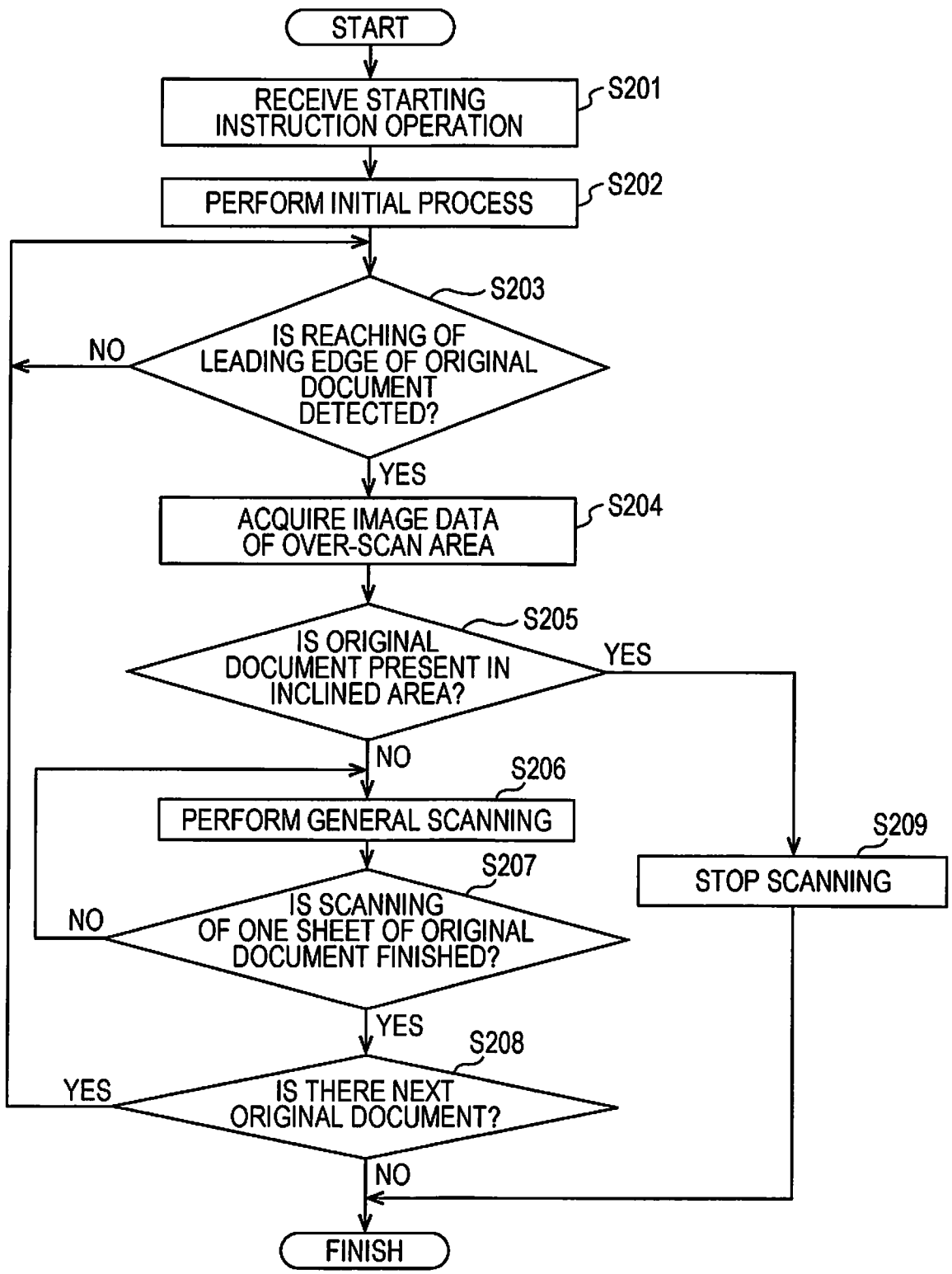
FIG. 16 is a flow chart describing processes of a second embodiment.

FIG. 16 is a flow chart describing processes of the embodiment. When a user sets the document and instructs start of scanning (S201), the process is started, and thus the initial process is firstly performed (S202). The initial process is an acquiring process or the like of the white reference value for shading correction in the same as the example of FIG. 11. When the leading edge of the first sheet of the document reaches a position of the document sensor 48 so as to press the lever (Yes in S203), scanning is started. When the scanning is started, the processing unit 60 acquires the image data of the over-scan area RO1 (S204), it is determined whether or not the data of the document is present in the inclined area RS (S205). Processes of S204 and S205 may be processes to be performed on the entire over-scan area RO1 as a target after data of the entire over-scan area RO1 is acquired. Otherwise, the processes of S204 and S205 may be processes of sequentially determining whether or not the document data is present pixels included in the inclined area RA in the line whenever image data by one line of the over-scan area RO1 is acquired.

In a case in which the document data is not present in the inclined area RS (No in S205), the scanning is continuously performed (S206). When the trailing edge of the first sheet of the documents passes through the position of the document sensor 48, and the scanning of the first sheet of the documents is finished by receiving transportation of the document by a predetermined distance after the lever returns (Yes in S207), it is determined whether or not the next document is present using the document sensor 45 (S208). In a case in which the next document is present (Yes in S208), the process returns to S203, reaching of the next document is detected, and the inclination error determination is started. In a case in which the next document is not present (No in S208), the process is finished. In addition, in a case in which the document data is present in the inclined area RS (Yes in S205), the scanning is immediately stopped (S209), and a fact of being skewing is notified to a user so that the process is finished.

4. Modification Example

Hereinafter, some modification examples will be described.

4.1 Another Example of Transporting Apparatus

Hitherto, the image reading apparatus 11 is exemplified as the transporting apparatus, but the transporting apparatus can be extended to other devices (electronic equipment). For example, the transporting apparatus may acquire the image data by reading the document using the image sensor provided on the transporting path 32, and may be a facsimile machine which transmits the image data using a communication circuit. Even in the facsimile machine, a point in which the image data is acquired is the same as that of the image reading apparatus 11. That is, it is desirable that the document is prevented from being damaged by a paper jam generated due to inclination, and an operation with respect to inclination at a degree at which the paper jam is not generated is continuously performed, and application of the method of the embodiment has great significance.

In addition, the transporting apparatus may be a printing apparatus which performs printing by discharging ink to a document while the document (printing medium) is transported. Also, the printing apparatus is not limited to an ink jet printer, and may be a laser printer which performs printing using a toner. Even in the printing apparatus, the document is needed to be prevented from being damaged by the paper jam due to the inclination. In addition, in the printing apparatus, when the same image (pattern) is multiply printed on the printing medium, and the document, which is a printed result, is finely cut, a use form of creating a plurality of products from one sheet of mediums is considered. In this case, even when the inclination is generated during printing, if a position to be cut out in a cut stage is adjusted, an appropriate product can be created. That is, even in the printing apparatus, there is a situation in which an operation can be continuously performed with respect to inclination at a degree at which the paper jam is not generated, and it is meaningful that the method of the embodiment is applied thereto. In addition to, the method of the embodiment can be extended to be used for various transporting apparatuses which transport the document using the transporting mechanism 31.

Also, in the first embodiment, the transporting apparatus is required to include a sensor which detects the tilt angle θ and the document size of the document D transported by the transporting mechanism 31. Here, the sensor may be the image sensor (reading unit 40, image sensor 42) the same as that in the image reading apparatus 11, but it is not limited thereto. For example, a non-contact sensor which determines presence and absence of the document by irradiation light beams or ultrasonic waves may be used, and a contact sensor which determines presence and absence of the document by a mechanical structure (for example, the same structure as that of the document sensor 48 of FIG. 3) may be used. In addition, in the second embodiment, the actual position of the leading edge of the document transported by the transporting mechanism 31 is detected, and the actual position is needed to be compared with the predicted position. Here, also the sensor used for detecting the actual position is not limited to the image sensor, and can be realized as various sensors.

4.2 Center Position in Width Direction of Document

In addition, in the description above, as illustrated in FIG. 5 or 6, it is assumed that the width center (CA) of the document D is transported by the transporting mechanism 31 so as to be along the width center (CB) of the transporting path 32. However, there is a case in which the width center of the document D and the center of the transporting path 32 in the width direction may be deviated from each other. This is because that there is a case in which the width center of the document D and the center of the transporting path 32 in the width direction may not match with each other at a stage where the document D is set in a feeding tray at first. Otherwise, the centers match with each other at a setting stage, but there is a case in which the centers may be deviated from each other due to inclination.

Figure 17:
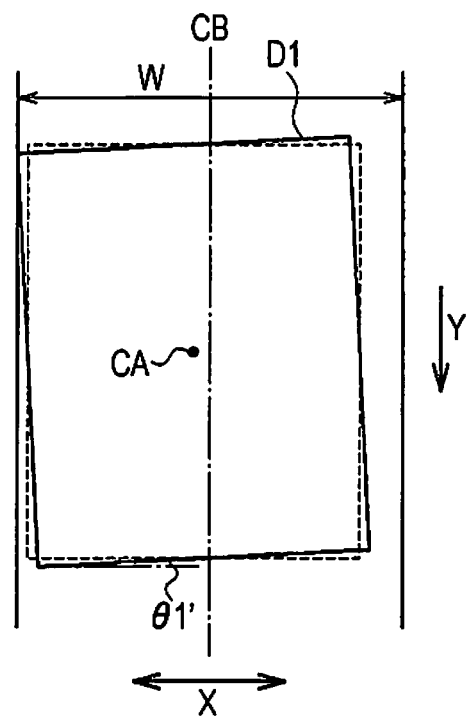
FIG. 17 is a schematic view illustrating a relationship between the document and the transporting path in a case in which a width center of the document and a width center of the transporting path are deviated from each other.

FIG. 17 is a description view of a positional relationship between the transporting path 32 and the document D1 in a case in which the width center (CA) of the document D and the width center (CB) of the transporting path 32 are deviated, and the document D1 having the same size as that in FIG. 5 is inclined. As seen from the comparison of FIGS. 5 and 17, in a case in which the width center is deviated, an upper limited value (the angle threshold) θ1' of the allowable tilt angle 9 becomes smaller than the angle threshold θ1 in a case in which there is no deviation. Accordingly, in a case in which the width center is deviated, when determination is performed using θ1 as the angle threshold, even if there is a concern that the paper jam is generated, there is a case in which the transporting operation cannot be stopped.

Accordingly, the processing unit 60 of a modification example determines that the inclination error has occurred at a small tilt angle, as compared to a case in which the deviation amount is small, in a case in which the width center of the document and the width center of the transporting path 32 are compared with each other, a deviation amount of the width center of the document with respect to the width center of the transporting path 32 is great. For example, if the document has a A4 size, in a case in which the width centers match with one other (including substantial matching), the angle threshold is set to four degree, and in a case in which the deviation amount of the width center is equal to or greater than a predetermined deviation threshold, the angle threshold is set to one degree. In addition, also with respect to documents having different sizes, different angle thresholds are set in accordance with the deviation amount of the width centers. Otherwise, a function f2 in association with the angle threshold, the document size, and the deviation amount of the width center may be set. In a case in which the angle threshold is set to $\theta_{Th}$, the document size is set to s, and the deviation amount of the width center is set to d, it is expressed by $\theta_{Th}$=f2 (s, d). Here, f2 is a function in which a value of $\theta_{Th}$ is monotonously reduced as a value of s becomes great or a value of d becomes great.

According to the first embodiment, the first reference point P1 (x1, y1) and the second reference point P2 (x2, y2) are detected. Accordingly, it is possible to obtain the width center of the document D by (x1+x2)/2. Since the width center of the transporting path 32 is already known by a design (for example, x=320), in the first embodiment, the deviation amount d of the width center can be calculated.

In the second embodiment, in the setting of the inclined area RS in the first place, a predetermined threshold becomes small as being closed to an end portion of the width direction, in other words, a determination condition is particular (occurrence of an inclination error is likely to be determined) as being close to the end portion of the width direction. As seen from the comparison of FIGS. 5 and 17, if the width center is deviated, one end of the leading edge portion of the document is moved to an end portion side of the width direction. That is, when the inclined area RS set in the second embodiment is used, the determination condition is set to be severe as the deviation amount of the width center is great, and it is possible to realize a process in which the inclination error is easily determined. That is, when the inclined area RS set in the second embodiment is used, in a case in which the deviation amount of the width center is great, as compared to a case in which the deviation amount is small, it is possible to realize a process of determining that the inclination error has occurred at a small tilt angle.

Particularly, in an example illustrated in FIG. 12, since each pixel on right and left sides of the over-scan area RO1 (vertical first line of x=0, vertical first line of x=639) is set to be in the inclined area RS, there is a high probability that the data of the document is present in the inclined area RS as the deviation amount of the width center is great. From this point of view, when the inclined area RS is used, in a case in which the deviation amount of the width center is great, as compared to a case in which the deviation amount is small, it is possible to realize a process of determining that an inclination error has occurred at a small tilt angle.

4.3 Stapled Document

In addition, as the document D, there is a plurality of documents which is bound by a stapler. A separating mechanism that separates and transports the document D one by one is provided in the transporting mechanism 31. For example, according to an example illustrated in FIG. 2, the driven roller 34B constituting the pair of feeding rollers 34 becomes a retard roller, and a friction coefficient with respect to the document D on the outer peripheral surface thereof becomes greater than a friction coefficient with respect to the document D on the outer peripheral surface of the driving roller 34A. Therefore, the pair of feeding rollers 34 functions as the separating mechanism that separates the document D one by one and sends the document to a downstream side in the transporting direction Y.

Figure 18:
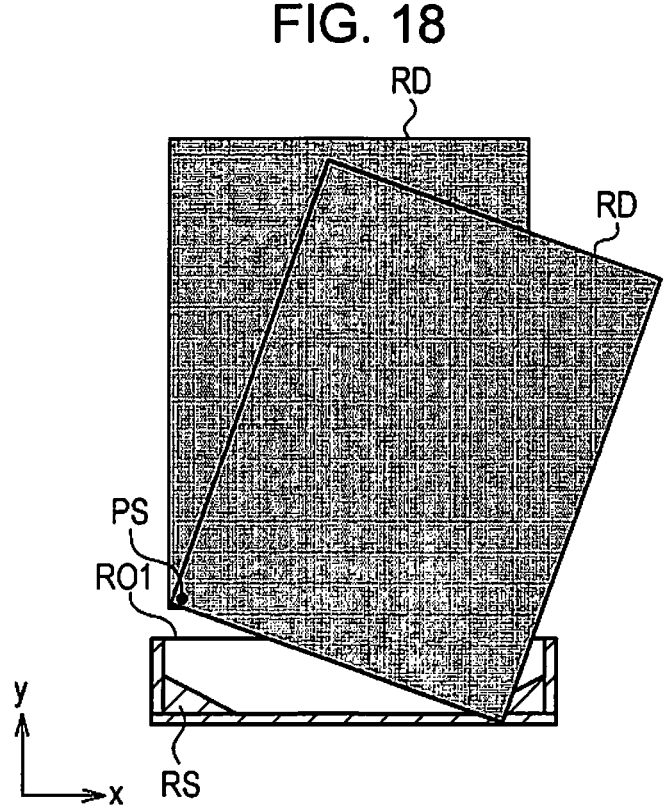
FIG. 18 is a view illustrating a relationship example of the document area and the inclined area in a case in which a stapled document is inclined.

FIG. 18 is a description view of a positional relationship of the over-scan area RO1, the inclined area RS, and the document area RD, in a case in which the stapled document D is set to an object. In a case in which the stapled document D is transported by the separating mechanism, inclination of the document is generated based on a position where the documents are bound (stapled place, corresponding to PS in example of FIG. 18) as a rotation center, and the tilt angle θ is significantly greater than that of the document D which is not stapled.

In addition, as illustrated in FIG. 3, separation using the separating mechanism is often performed on an upstream side more than detection of the document D using the document sensor 48. Therefore, at a timing when the document sensor 48 detects the document D, the document D is inclined at a tilt angle θ which is already significantly great. As a result, at a timing when the document sensor 48 detects the document, a part of the document D often reaches already a position of the image sensor. In this case, data of the document D is present in the first line (horizontal first line of y=0) of the over-scan area RO1.

Accordingly, in the second embodiment, as illustrated in FIG. 12, one pixel on a lower end of the over-scan area RO1 is set in the inclined area RS. In this way, even in a case in which the tilt angle θ is significantly great as the stapled document D, it is possible to appropriately detect the inclination error. At this time, when the determining process is executed line by line sequentially, generation of the inclination error can be detected in one line, thus the transporting operation is immediately stopped, and thereby making it possible to suppress damage of the document D.

Also, hitherto, the example of the stapled document D is described, but it is possible to also consider a case in which binding of a plurality of documents using fasteners other than a stapler in the same manner.

4.4 The Other Documents

The document D is not necessarily a vertical rectangle shaped. Therefore, as the document size, both the length and the width of the document may be acquired, or the length of the document in the width direction in each of a plurality of positions in a length direction may be acquired. In a case in which a document size in a broad sense is acquired in any case and a paper jam is generated with the document size, an angle threshold or an inclined area is set based on the document size so as to be capable of detecting generation of the inclination error. Also, the document size may be acquired by measuring the document, may be input by a user, or may be acquired by a combination of these methods.

4.5 Program or the Like

In addition, a part or most of the processes of the transporting apparatus of the embodiment (image reading apparatus 11) may be realized. In this case, when the processor such as a CPU executes the program, the image reading apparatus 11, the host device 100, and the like of the embodiment are realized. Specifically, a program stored in a non-transitory information storage medium is read, and the read program is executed by the processor such as a CPU. Here, the information storage medium (medium readable by computer) saves programs, data, or the like, and a function thereof can be realized by an optical disk (DVD, CD, or the like), a hard disk drive (HDD), a memory (card type memory, ROM, or the like) or the like. Also, the processor such as a CPU performs various processes of the embodiment based on the program (data) being saved in the information storage medium. That is, in the information storage medium, a program (program for executing process of each unit by computer) for functioning a computer (apparatus including an operating unit, a processing unit, a storage unit, and outputting unit) as each unit of the embodiment is stored.

That is, the method of the embodiment can be applied for a program which causes a computer (transporting apparatus, controller 50) to control the transporting mechanism 31 that transports the document along the transporting path 32, and based on the document size of the document, to perform a process of determining that the inclination error has occurred. The method may be applied for a program which causes a computer (transporting apparatus, controller 50) to execute the process of determining that the inclination error has occurred, based on any one of the document size of the document, the center position of the document in the width direction, the position where the document is bound, and the like.

In addition, the method of the embodiment can be applied to a control method of the transporting apparatus which performs the control of the transporting mechanism 31 that transports the document along the transporting path 32, and based on the document size of the document, the process of determining that the inclination error has occurred. The method may be applied for a program which causes the control method of the transporting apparatus to perform the process of determining that the inclination error has occurred, based on at least any one of the document size of the document, the center position of the document in the width direction, the position where the document is bound, and the like.

Hitherto, the embodiments to which the invention is applied and the modification example thereof are described, but the invention is not limited to each embodiment or the modification example thereof as it is, in an implement stage, configuration components can be modified and materialized within a range of not being deviated from a gist of the invention. In addition, the embodiments described above or a plurality of configuration components disclosed in the modification example are appropriately combined, and thus various invention can be formed. For example, some of the embodiments described above or all configuration components disclosed in the modification example may be deleted. Further, configuration components described in the other embodiments or modification examples may be appropriately combined. In addition, in this specification or drawings, at least once, terms disclosed with the other terms in a broad sense or the same as each other can be replaced with terms other than the terms even in any part of the specification or the drawings. As described above, various modifications or applications can be performed within a range of not departing from the gist of the invention.

The entire disclosure of Japanese Patent Application No. 2017-198253, filed Oct. 12, 2017 is incorporated by reference herein.

What is claimed is:

1. A transporting apparatus comprising:
   a transporting mechanism having a roller that is configured to transport a document along a transporting path; and
   a processing unit configured to determine whether or not an inclination error has occurred in accordance with a document size of the document and a tilt angle of the document by determining whether or not the tilt angle of the document is smaller than a threshold tilt angle that is set such that the larger the document size of the document is, the smaller the threshold tilt angle is,
   the processing unit being further configured to control the transporting mechanism to stop transporting the document in response to determining that the tilt angle of the document is not smaller than the threshold tilt angle that is set such that the larger the document size of the document is, the smaller the threshold tilt angle.

2. The transporting apparatus according to claim 1, further comprising:
   a sensor configured to detect the tilt angle and the document size of the document transported by the transporting mechanism.

3. The transporting apparatus according to claim 2,
   wherein the sensor is an image sensor configured to read an image of the document in a reading area on the transporting path and outputs image data, and
   wherein the processing unit is configured to perform determination of the inclination error based on data in an area to be determined including an over-scan area on a leading edge side in the image data.

4. The transporting apparatus according to claim 3,
   wherein the processing unit is configured to obtain the document size and the tilt angle based on the data in the area to be determined, and to determine the inclination error by a process of comparing the threshold tilt angle set in accordance with the document size with the tilt angle detected by the sensor.

5. The transporting apparatus according to claim 1,
   wherein the processing unit is configured to compare a width center of the document with a width center of the transporting path, and to determine whether or not the inclination error has occurred in accordance with the document size of the document, the tilt angle of the document, and a deviation amount of the width center of the document from the width center of the transporting path.

6. The transporting apparatus according to claim 5,
   wherein the inclination error is determined to occur at a small tilt angle in a case in which the deviation amount is great as compared to a case in which the deviation amount is small.

7. The transporting apparatus according to claim 1, wherein
   the processing unit is configured to set a plurality of threshold tilt angles respectively corresponding to a plurality of document sizes.

8. The transporting apparatus according to claim 1, wherein
   the roller of the transporting mechanism is configured to transport a first document and a second document along the transporting path, the first document being larger than the second document, and the processing unit is configured to determine the inclination error has occurred in the first document when a tilt angle of the first document is equal to or larger than a first threshold angle and to determine the inclination error has occurred in the second document when a tilt angle of the second document is equal to or larger than a second threshold angle that is larger than the first threshold angle.

9. A transporting apparatus comprising:

a transporting mechanism having a roller that is configured to transport a document along a transporting path; and a processing unit configured to determine an inclination error of the document, wherein the processing unit is configured to determine whether or not the inclination error has occurred in accordance with a document size of the document and a tilt angle of the document, the processing unit is configured to compare a predicted position corresponding to a position of a leading edge of the document in a case in which an inclination is not generated with an actual position of a leading edge of the document transported by the transporting mechanism, and to determine that the inclination error has occurred in a case in which the actual position is deviated from the predicted position by a predetermined threshold or more on a downstream side of the transporting path, and a first threshold which is the predetermined threshold at a first position on the transporting path in a width direction is greater than a second threshold which is the predetermined threshold at a second position, which is a position closer to an end portion side than the first position on the transporting path in the width direction.

10. The transporting apparatus according to claim 9, further comprising:

an image sensor configured to read an image of the document in a reading area on the transporting path and outputs image data, wherein the processing unit is configured to detect the actual position of the leading edge of the document based on the image data and performs determination of the inclination error based on the detected actual position.

11. The transporting apparatus according to claim 9, further comprising:

an image sensor configured to read an image of the document in a reading area on the transporting path and outputs image data, wherein the processing unit is configured to determine that the inclination error has occurred in a case in which the document is present in an inclined area in an over-scan area on a leading edge side of the image data, and wherein the inclined area is an area corresponding to the first threshold and the second threshold.

12. The transporting apparatus according to claim 11, wherein the inclined area is a linearly symmetrical area with a width center of the transporting path as a symmetry axis.

13. The transporting apparatus according to claim 9, wherein the first threshold is a threshold set based on a position of the leading edge side of the document in a case in which a first document is inclined by a first tilt angle, and wherein the second threshold is a threshold set based on the position of the leading edge of the document in a case in which a second document having a document size greater than that of the first document is inclined by a second tilt angle smaller than the first tilt angle.

14. A non-transitory computer readable medium storing a program causing a computer to execute:

controlling a transporting mechanism that transports a document along a transporting path;

determining whether or not an inclination error has occurred in accordance with a document size of the document and a tilt angle of the document by determining whether or not the tilt angle of the document is smaller than a threshold tilt angle that is set such that the larger the document size of the document is, the smaller the threshold tilt angle is; and controlling the transporting mechanism to stop transporting the document in response to determining that the tilt angle of the document is not smaller than the threshold tilt angle that is set such that the larger the document size of the document is, the smaller the threshold tilt angle.

15. A control method of a transporting apparatus comprising:

controlling a transporting mechanism that transports a document along a transporting path;

determining whether or not an inclination error has occurred in accordance with a document size of the document and a tilt angle of the document by determining whether or not the tilt angle of the document is smaller than a threshold tilt angle that is set such that the larger the document size of the document is, the smaller the threshold tilt angle is; and controlling the transporting mechanism to stop transporting the document in response to determining that the tilt angle of the document is not smaller than the threshold tilt angle that is set such that the larger the document size of the document is, the smaller the threshold tilt angle.

* * * * *